(12) United States Patent
Schmitter et al.

(10) Patent No.: US 10,339,226 B2
(45) Date of Patent: Jul. 2, 2019

(54) SYSTEM AND METHOD FOR DEFINING WATERTIGHT AND LOCALLY REFINABLE SURFACES WITH INTERPOLATORY CONTROL POINTS

(71) Applicant: ECOLE POLYTECHNIQUE FEDERALE DE LAUSANNE (EPFL), Lausanne (CH)

(72) Inventors: Daniel Schmitter, Renens (CH); Masih Nilchian, Ecublens (CH); Michael Unser, Ecublens (CH); Pablo Garcia-Amorena, Ecublens (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 502 days.

(21) Appl. No.: 15/177,303

(22) Filed: Jun. 8, 2016

(65) Prior Publication Data
US 2017/0357736 A1    Dec. 14, 2017

(51) Int. Cl.
*G06F 17/50*   (2006.01)
*G06F 17/11*   (2006.01)
(Continued)

(52) U.S. Cl.
CPC .............. *G06F 17/50* (2013.01); *G06F 17/11* (2013.01); *G06T 17/30* (2013.01); *G06T 19/20* (2013.01);
(Continued)

(58) Field of Classification Search
None
See application file for complete search history.

(56) References Cited

U.S. PATENT DOCUMENTS

| 5,345,546 A | 9/1994 | Harada et al. |
| 5,602,979 A | 2/1997 | Loop |

(Continued)

FOREIGN PATENT DOCUMENTS

| EP | 1840841 A1 | 10/2007 |
| EP | 2405373 A2 | 1/2012 |

OTHER PUBLICATIONS

Karciauskas et al. Smooth multi-sided blending of biquadratic splines Computer & Graphics 46, 2015, pp. 172-185.*

(Continued)

*Primary Examiner* — Rehana Perveen
*Assistant Examiner* — Cuong V Luu
(74) *Attorney, Agent, or Firm* — Andre Roland S.A.; Nikolaus Schibli

(57) ABSTRACT

A method for creating a watertight boundary between two graphical elements including the steps of displaying a first surface having a first shape and a second surface having a second shape on the display, an open space existing between the first surface and the second surface, defining a first region of the first surface, and defining a second region of the second surface, and modifying the first surface to a modified first surface such that the first region matches with the second region and the modified first surface and the second surface form a watertight connection at a modified first region and the second region, the step of modifying including geometrically matching the first region of the first surface with the second region of the second surface to establish the modified first region.

20 Claims, 17 Drawing Sheets

(51) Int. Cl.
*G06T 17/30* (2006.01)
*G06T 19/20* (2011.01)

(52) U.S. Cl.
CPC .. *G06F 2217/16* (2013.01); *G06T 2219/2008* (2013.01); *G06T 2219/2021* (2013.01)

(56) References Cited

U.S. PATENT DOCUMENTS

| | | | |
|---|---|---|---|
| 5,619,625 | A | 4/1997 | Konno et al. |
| 6,198,979 | B1 | 3/2001 | Konno |
| 6,256,038 | B1 | 7/2001 | Krishnamurthy |
| 6,271,856 | B1 | 8/2001 | Krishnamurthy |
| 6,476,804 | B1 | 11/2002 | Costabel |
| 7,274,364 | B2 | 9/2007 | Sederberg |
| 8,471,852 | B1 | 6/2013 | Bunnell |
| 8,836,701 | B1* | 9/2014 | Rockwood .............. G06F 17/50 345/423 |
| 2004/0174362 | A1 | 9/2004 | Celniker |
| 2004/0189633 | A1* | 9/2004 | Sederberg .............. G06F 17/50 345/418 |
| 2006/0017723 | A1 | 1/2006 | Baran et al. |
| 2006/0284870 | A1 | 12/2006 | Ardon et al. |
| 2007/0242067 | A1* | 10/2007 | Sharma .................. G06T 17/20 345/423 |
| 2008/0024499 | A1 | 1/2008 | Bateman |
| 2011/0080405 | A1* | 4/2011 | Moreton ................. G06T 17/20 345/423 |

OTHER PUBLICATIONS

Sablonniere Quasi-interpolants associated with H-splines on a three-direction mesh Journal of Computational and Applied Mathematics 66, 1996, pp. 433-442.*

Schmidt et al. Sketch-Based Procedural Surface Modeling and Compositing Using Surface Trees Eurographics vol. 27 No. 2, 2008.*
Sablonnière, Paul. "Quasi-interpolants associated with H-splines on a three-direction mesh." Journal of computational and applied mathematics 66.1-2 (1996): 433-442.
Schmitter, Daniel, Ricard Delgado-Gonzalo, and Michael Unser. "Trigonometric interpolation kernel to construct deformable shapes for user-interactive applications." IEEE Signal Processing Letters 22.11 (2015): 2097-2101.
Sederberg, Thomas W., et al. "Watertight trimmed NURBS." ACM Transactions on Graphics (TOG). vol. 27. No. 3. ACM, 2008.
Conti, Costanza, Lucia Romani, and Michael Unser. "Ellipse-preserving Hermite interpolation and subdivision." Journal of Mathematical Analysis and Applications 426.1 (2015): 211-227.
Forsey, David R., and Richard H. Bartels. "Hierarchical B-spline refinement." ACM Siggraph Computer Graphics. vol. 22. No. 4. ACM, 1988.
Mortenson, "Geometric Modeling", Chapter 7, Wiley and Sons., 2nd edition, 1997.
Piegl, Les. "On NURBS: A survey." IEEE Computer Graphics and Applications 1 (1991): 55-71.
Sederberg et al., "T-spline Simplification and Local Refinement", ACM Transactions on Graphics, vol. 23, Issue 3, Aug. 2004, p. 276-283.
Sederberg et al., "T-splines and T-NURCCs", ACM Transactions on Graphics, vol. 22, Issue 3, Jul. 2003, p. 477-478.
International Search Report from PCT/IB2017/053385 dated Oct. 23, 2017.
Li et al., "Surface modeling with polynomial splines over hierarchical T-meshes." The Visual Computer, vol. 23, No. 12, 2007, pp. 1027-1033.
Written Opinion of the International Search Authority for PCT/IB2017/053385 dated Oct. 23, 2017.

* cited by examiner

SYSTEM AND METHOD FOR DEFINING WATERTIGHT AND LOCALLY REFINABLE SURFACES WITH INTERPOLATORY CONTROL POINTS

FIELD OF INVENTION

The present invention relates to a system, method and device for computer graphics representation, animation, and modeling, more specifically the defining of a locally and globally refinable modeled surface of graphical objects which is watertight.

BACKGROUND

Shape design and, in particular, the modeling of surfaces is fundamental in computer aided design (CAD), computer aided manufacturing (CAM) as well as in computer graphics and animation. The methods to model surfaces are based on computational geometry which either use polygon meshes, subdivision or non-uniform rational B-splines (NURBS) to express a surface shape. Polygon meshes and subdivision-based models are popular because of their simple structure. Their drawbacks are that a lot of parameters are involved and the resulting shapes are not smooth. The most widely used technology in computational geometry is based on NURBS. Some of the advantages of NURBS are that they allow interactive and smooth free-form surface modeling for organic shape design. They can also exactly represent conic sections such as circles and ellipses, which are important shape primitives used in shape modeling processes to construct cylinders, spheres, tori and ellipsoids. Further, there exist many efficient and stable numerical algorithms to construct NURBS objects. Aside from their convenient properties, one of the main reasons why NURBS are widely used is that they have been recognized early on by the industry. Because NURBS cannot model surfaces with arbitrary topology as they are restricted to have a rectangular parameter domain, in practice complex objects are modeled by concatenating several NURBS patches.

A longstanding and well known problem in NURBS design is that in practice, it is generally impossible to construct physically tight boundaries between different NURBS patches, except for very rare cases. The reason is that due to the non-uniform alignment of the spline nodes and the different degrees of NURBS used to construct adjacent surface patches, the curves that have to be merged to create an overlapping boundary at the intersection between two surfaces are not equal. Another drawback of NURBS is that they are not locally refinable. This implies that in the process of shape modeling, when a user needs to add more flexibility to a region by increasing the number of control points, this is only possible by globally adding control points. This results in an excess of parameters and increases the complexity of the model where it is not required.

Although NURBS allow the representation of conic sections, e.g., circles, ellipses, parabolas, hyperbolas, it is not possible to use them to represent transcendental curves such as helices, spirals or cyloids. Furthermore, there are weights in the NURBS formulation that have no physical interpretation and are non-intuitive to handle. In interactive shape modeling they are typically hidden to the user, who only interacts with the control points.

Another fundamental limitation of NURBS and T-splines, which are a generalization of NURBS, is that they are not interpolatory except for the degree 0 and 1, which corresponds to a non-smooth polygon-based model. This is a problem when dealing with complicated, possibly twisted, organic surfaces because the control points do not lie on the surface of the object and hence, might cause non-intuitive behavior. FIG. 1 illustrates the difference between surface modeling with and without interpolatory control points. Two models of a human brain are shown. It can be seen that the modeling of the right surface becomes very difficult when the complexity of the surface increases because the control points do not directly lie on the surface as opposed to the case shown on the left.

Furthermore, NURBS do not provide direct access to control quantities that depend on higher order derivatives of an object such as tangent planes or curvature. Therefore, in NURBS and T-spline modeling, the user can only control a shape by changing the vertices of the control polygon. Because these vertices do not interpolate the shape, the more control points are used, the more difficult it becomes for the user to associate a control point with the corresponding region of the surface that is affected.

Accordingly, in light of the above described deficiencies in methods and systems for modeling, displaying, modifying, and animating graphical objects and their surfaces, advanced technologies and methods are desired, to further improve display, manipulation, and modification of graphical objects, for example to create watertight boundaries between two graphical objects.

SUMMARY OF THE INVENTION

According to one aspect of the present invention, a method for creating a watertight boundary between two graphical elements is provided, the method being performed on a computer device having a display and memory. Preferably, the method comprising the steps of displaying a first surface having a first shape and a second surface having a second shape on the display, an open space existing between the first surface and the second surface, and defining a first region of the first surface, and defining a second region of the second surface. In addition, the method further preferably includes a step of modifying the first surface to a modified first surface such that the first region matches with the second region and the modified first surface and the second surface form a watertight connection at a modified first region and the second region, the step of modifying preferably including geometrically matching the first region of the first surface with the second region of the second surface to establish the modified first region.

According to another aspect of the present invention, a computer system having a hardware processor, a display, and memory is provided, the hardware processor configured to perform an image processing method for creating a watertight boundary between two graphical elements. Preferably, the hardware processor is configured to instruct to display a first surface having a first shape and a second surface having a second shape on the display, an open space existing between the first surface and the second surface, and to receive instructions to define a first region of the first surface, and to define a second region of the second surface. Moreover, the hardware processor is preferably further configured to modify the first surface to a modified first surface such that the first region matches with the second region and the modified first surface and the second surface form a watertight connection at a modified first region and the second region, the modifying including mathematically geometrically matching the first region of the first surface with the second region of the second surface to establish the modified first region.

According to still another aspect of the present invention, a non-transitory computer readable medium having computer instructions recorded thereon is provided, the computer instructions configured to perform a method when executed on a hardware processor of a computer having memory and a display. Preferably, the method includes the steps of displaying a first surface having a first shape and a second surface having a second shape on the display, an open space existing between the first surface and the second surface, and defining a first region of the first surface, and defining a second region of the second surface. Moreover, preferably a step of modifying the first surface to a modified first surface is provided such that the first region matches with the second region and the modified first surface and the second surface form a watertight connection at a modified first region and the second region, the step of modifying including geometrically matching the first region of the first surface with the second region of the second surface to establish the modified first region.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

Herein, identical reference numerals are used, where possible, to designate identical elements that are common to the figures. Also, the images may be simplified for illustration purposes and may not be depicted to scale.

DETAILED DESCRIPTION OF THE SEVERAL EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 10:
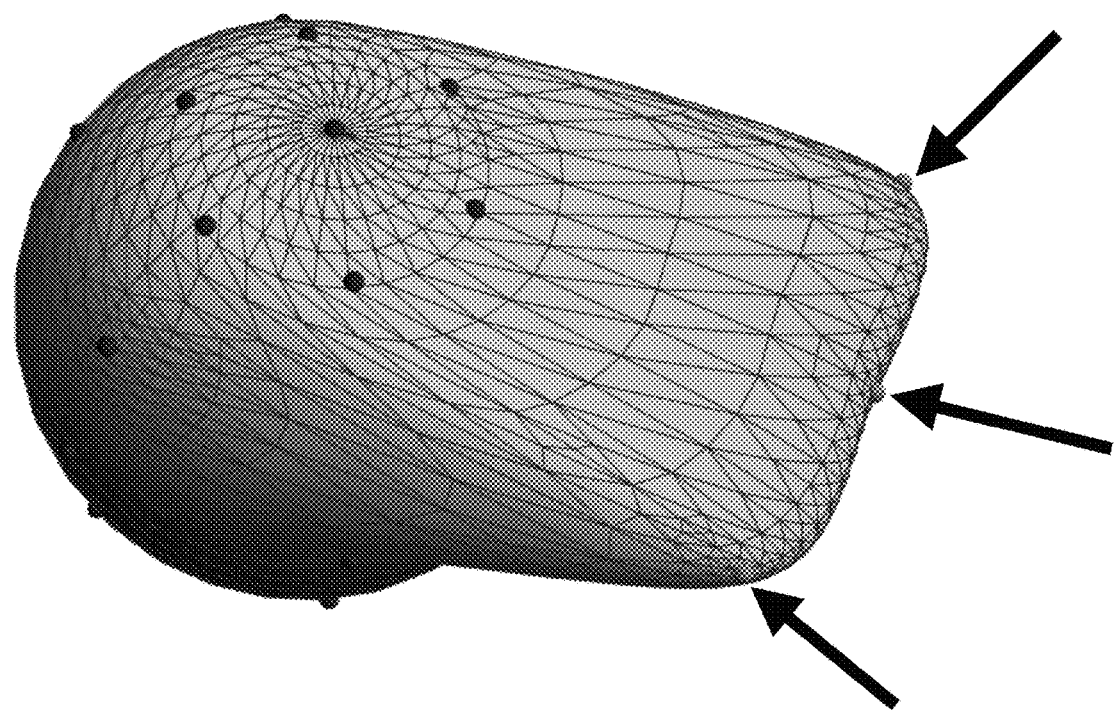
FIG. 10 shows the spherical surface together with the three control points, indicated by arrows, that represent the boundary that needs to be watertightly joined to the rectangular surface shown in FIG. 11.
Figure 15:
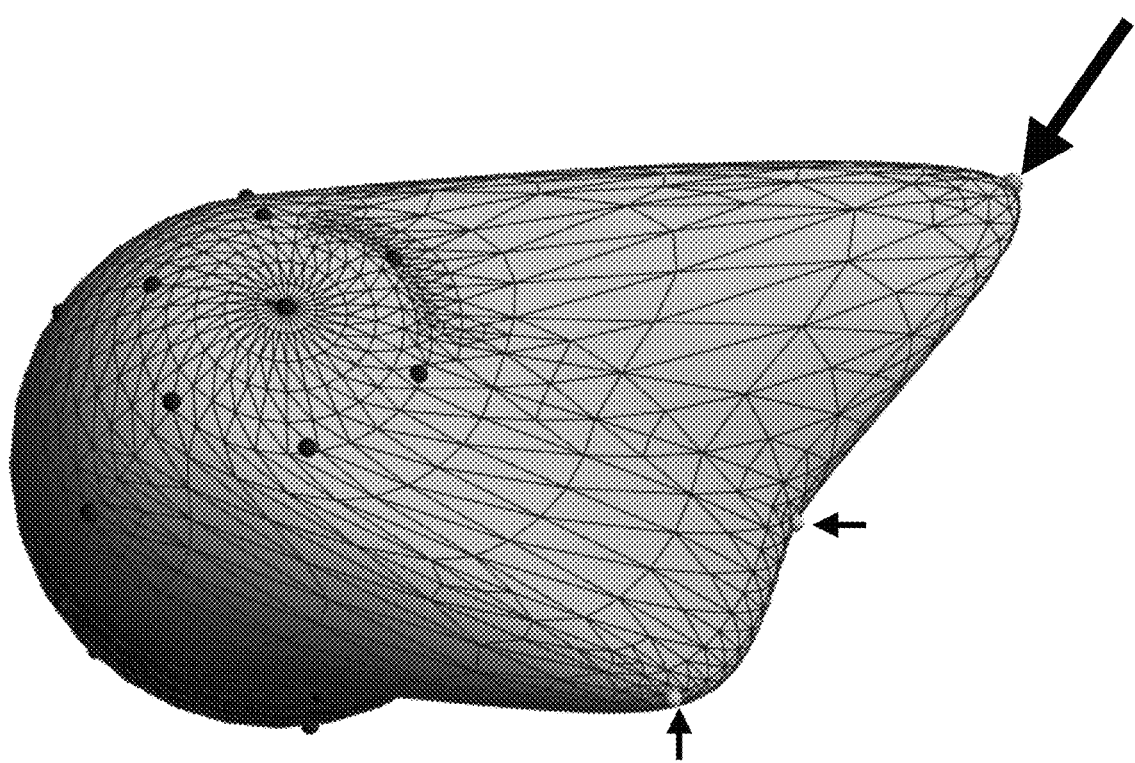
FIG. 15 shows the spherical patch of the combined surface with modified control point shown with the large arrow. The two small arrows indicate the control points that have not been modified.

According to some aspects of the present invention, a system and a method are provided that allow to strongly extend and improve upon non-uniform rational B-spline surfaces, hereinafter referred to as "NURBS," called Hermite splines, hereinafter referred to as "H-splines." One limitation of NURBS and T-spline surfaces is that they cannot be interpolatory and smooth, i.e., $C^1$, at the same time. Thus, interpolatory NURBS models are constructed through linear interpolation between the control points and the resulting surface correspond to polygon meshes which have a lot of discontinuities such as non-smooth edges and kinks. H-splines allow to construct interpolatory surfaces that are at least in $C^1$. This means that they are smooth which allows organic shape design and the control points are directly lying on the surface. FIG. 10 shows such an H-spline surface with interpolatory control points. FIG. 15 shows the same surface after the control point indicated by the large arrow has been moved and hence, the shape of the surface is modified. Here, surface modeling based on first and second order H-splines is presented. This means that $C^1$ and $C^2$ shapes can be modeled. However, the herein presented concept is directly generalizable for arbitrary high orders.

Figure 1A:
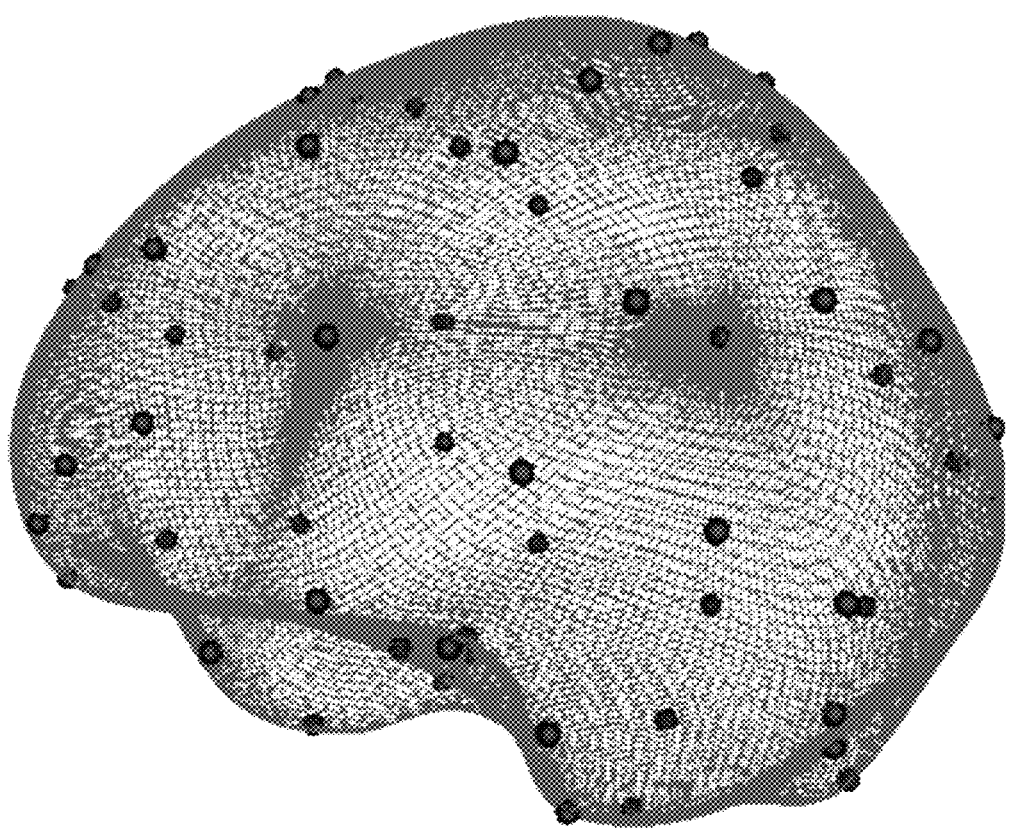
FIGS. 1A-1B are schematic representations of a graphical object representing the difference between a surface constructed with interpolatory control points in FIG. 1A and non-interpolatory control points in FIG. 1B.
Figure 1B:
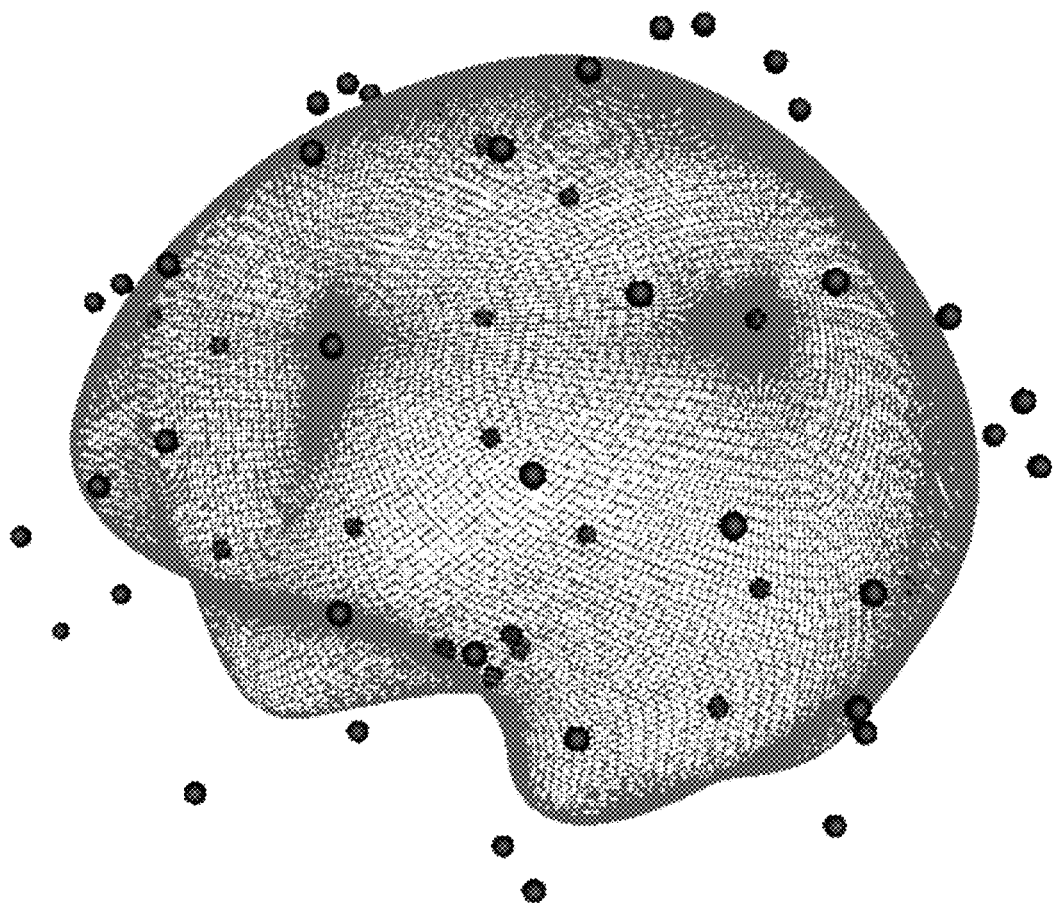
Figure 2:
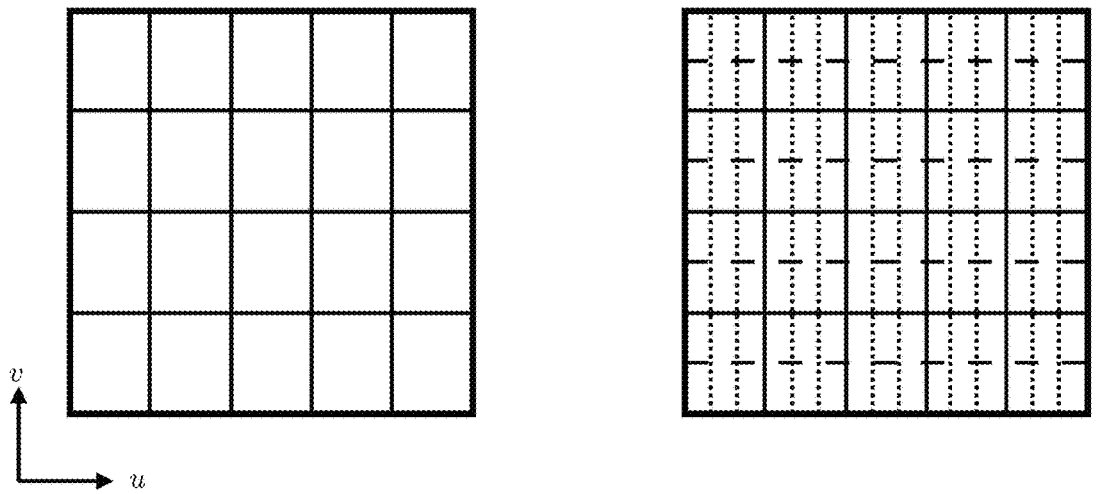
FIG. 2 is a schematic representation of a control mesh of a tensor-product surface on the left and the control mesh after a global refinement has been applied to it in both directions on the right.

One drawback of NURBS surfaces that has been solved by the creation of T-splines is that NURBS do not allow to locally refine surfaces. A refinement is generally characterized by increasing the number of parameters without changing the geometry of the surface object. With T-splines, this is done by introducing T-junctions into the control mesh of a surface. NURBS only allow for a global refinement which results in an excess of unused parameters in the case where only a local refinement is needed. On the left in FIG. 2, the control mesh of a parametric surface is shown where the parameter domain is given by the directions u and v. In the case of NURBS, a refinement of one region in the control mesh must necessarily result in a refinement of the entire control mesh as shown in the right of FIG. 2. The horizontal dashed lines illustrate the refinement with respect to the u-direction and the vertical dotted lines show the refinement with respect to the v-direction. The T-spline solution for local refinement has a drawback as it requires the introduction of new local coordinate systems for each region that must be refined. These local coordinates are independent of the global parameterization and introduce a certain parameterization-incompatibility. The formulation is algorithmic and becomes complicated if a lot of T-junctions need to be inserted in a mesh.

In Sederberg's publications, see Sederberg et al., "T-splines and T-NURCCs", ACM Transactions on Graphics, Vol. 22, Issue 3, July 2003, pp. 477-478, and Sederberg et al., "T-spline Simplification and Local Refinement", ACM Transactions on Graphics, Vol. 23, Issue 3, August 2004, pp. 276-283, these publications herewith incorporated by reference in their entirety, a generalized formulation of NURBS called "T-splines" has been presented. They allow to construct T-structures in the parameter domain by inserting T-junctions. Based on T-splines an algorithm was proposed to mathematically tighten the intersections between NURBS surfaces that have the same degree. Sederberg published a method for local refinement of T-splines to add local flexibility to NURBS. Due to the tensor-product structure of NURBS, up to now, refining one basis function entailed that an entire row or column of nodes in the rectangular parametric domain had to be added. Hence, only global refinements were possible. Sederberg's algorithm presented a way to construct detailed NURBS surfaces without the need of an excess of degrees of freedom. The existing T-spline technology only allows to connect surface patches by joining two boundaries of the control mesh. No solution has been proposed to connect arbitrary regions of two control meshes with each other.

Figure 4:
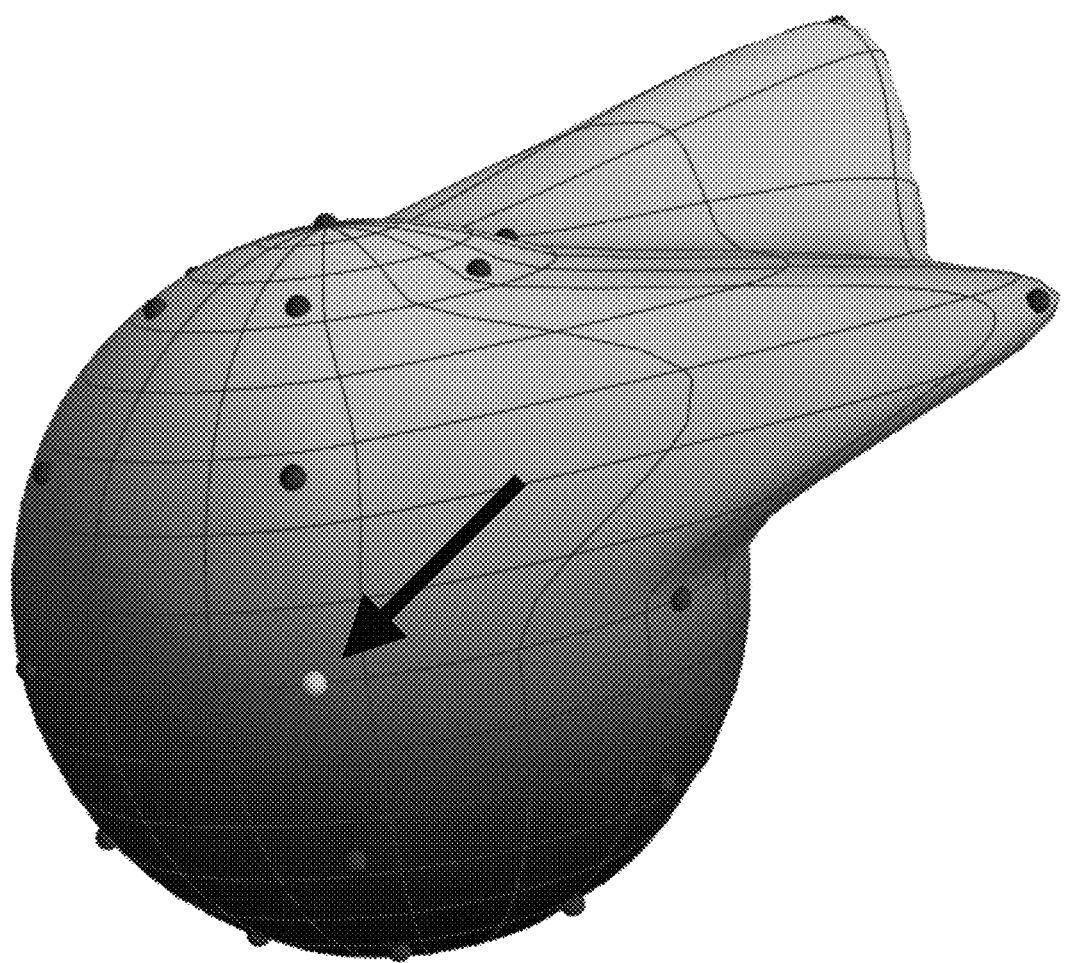
FIG. 4 is a schematic representation depicting an H-spline surface where the arrow indicates the control point (bright) that needs to be refined. The other control points are shown in black.
Figure 5:
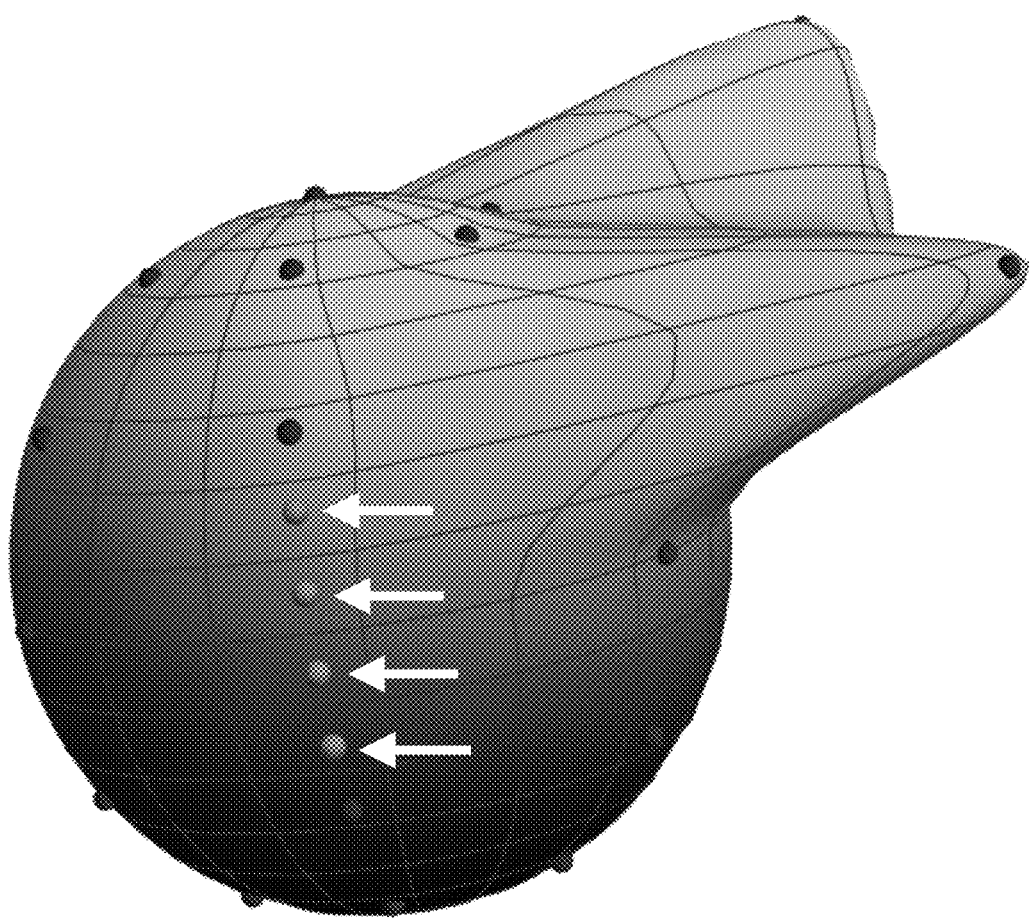
FIG. 5 illustrates a surface that has been locally refined by refining the control point indicated by an arrow in FIG. 4. In this example this operation has created 4 new control points without changing the geometry of the surface. They are indicated by white arrows.

With H-splines, a local refinement in one or both directions of the control mesh is possible without changing the geometry of the surface. The operation is mathematically in-line with the global parameterization and is based on digital filters. FIG. 4 depicts an H-spline surface where the arrow indicates the control point (bright) to be refined. The other control points are shown as dark points. FIG. 5 shows the refined surface that keeps the same geometry. In this example, the refinement operation has created four (4) new control points without changing the geometry of the surface. This increases the flexibility of the region controlled by the 4 new control points, because their displacement allows for a more local control of the surface.

Another limitation of T-splines and NURBS is that they do not allow the direct control of quantities from differential geometry, which depend on higher order derivatives such as controlling tangents, tangent planes, and curvature. H-splines do not only interpolate the surface itself but also its higher order derivatives and cross-derivatives.

Figure 6A:
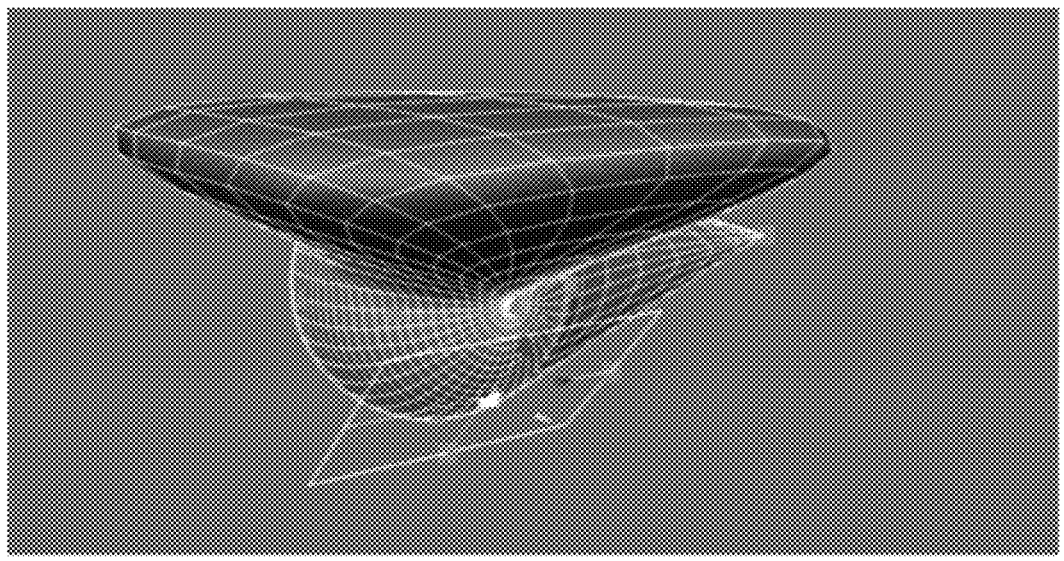
FIGS. 6A-6B depict schematically how surface modeling with H-splines allows direct control of tangent planes, and in FIG. 6C, a rendering of such a surface is shown.
Figure 6B:
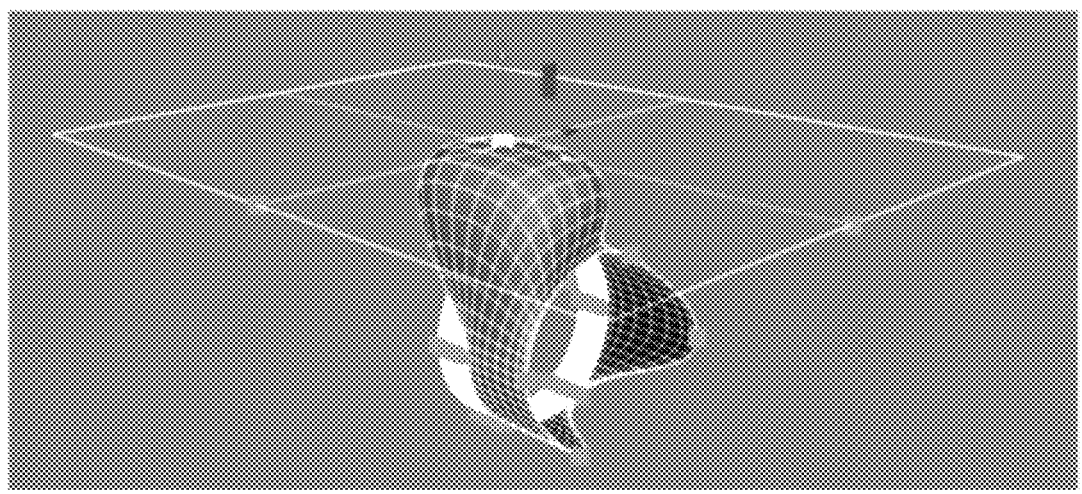
Figure 6C:
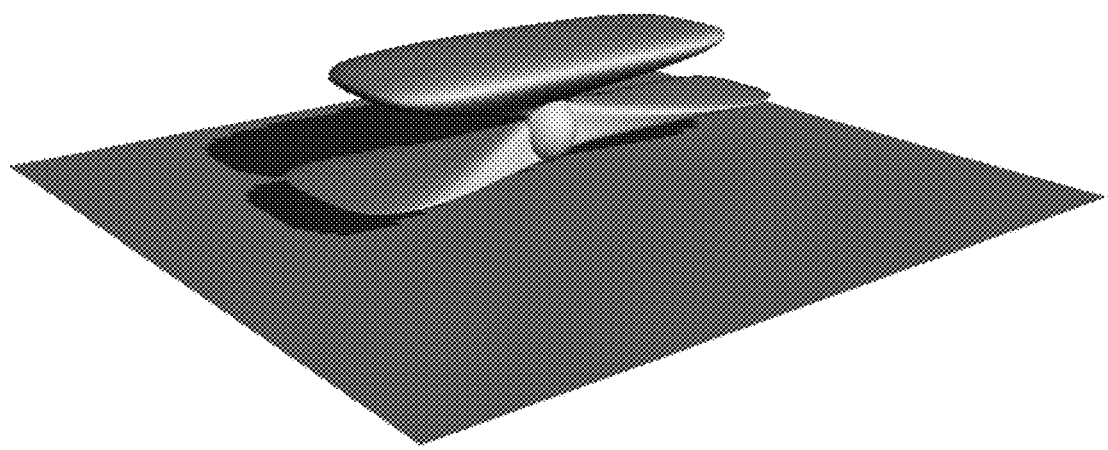
Figure 7:
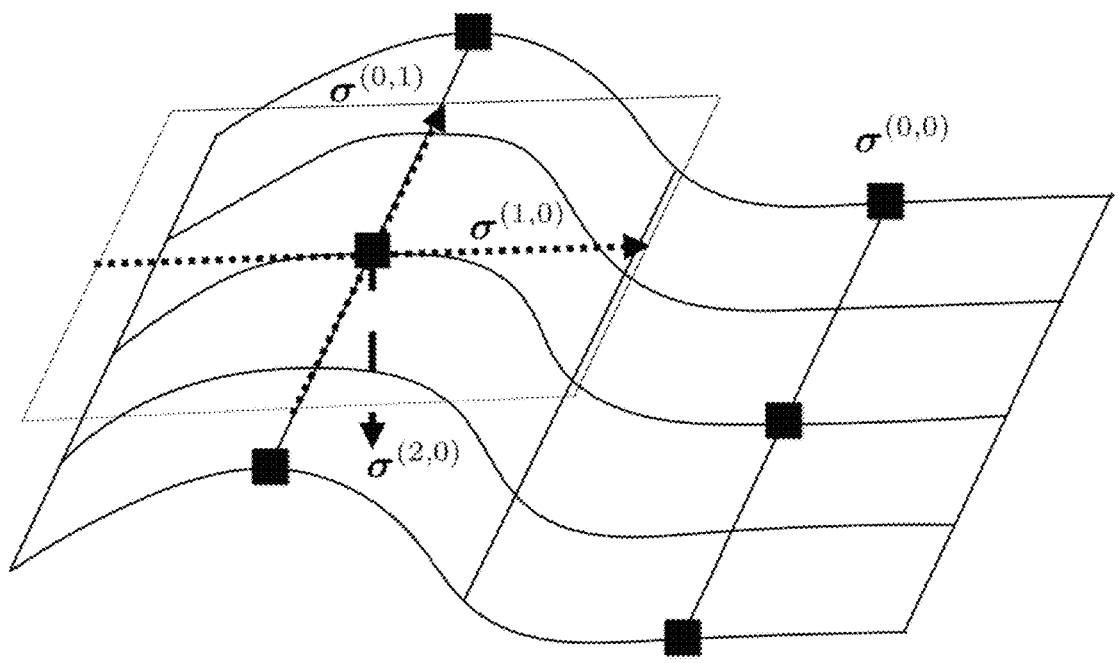
FIG. 7 shows how surface modeling with H-splines allows direct control of the curvature on profile curves of the surface.
Figure 7:
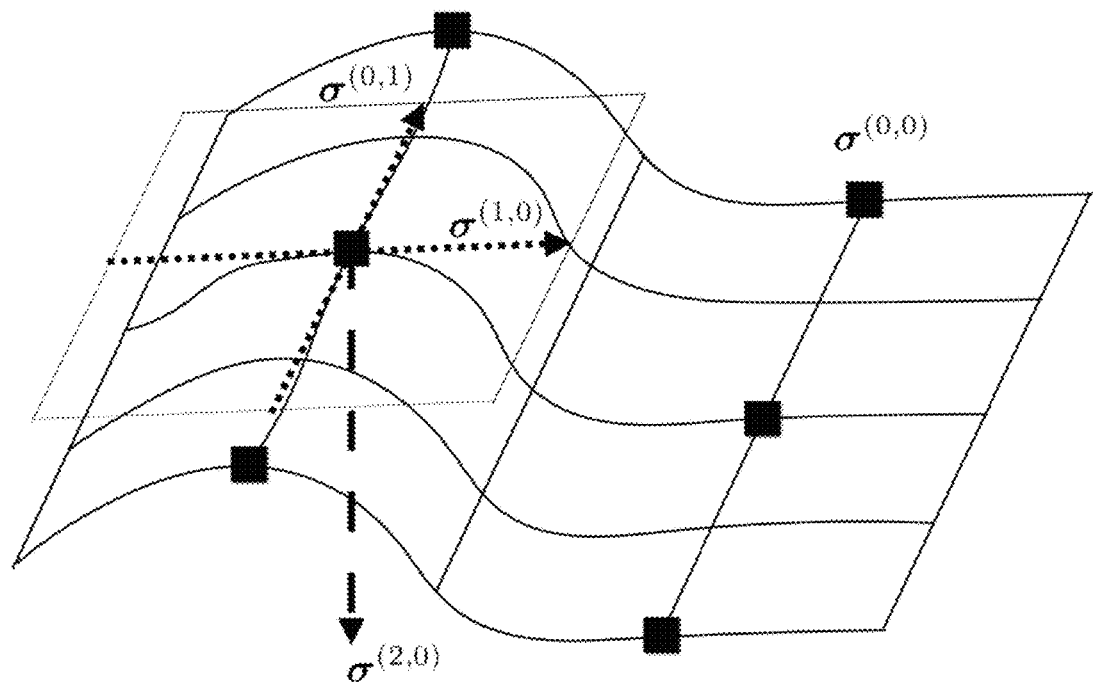

This allows to directly control the tangent planes or the curvature of a curve along one parameter direction. This feature allows for new possibilities in shape modeling because by modifying the tangent plane, the surface is locally modified without changing the location of the interpolating control point. In the top of FIG. 6, the surface modeling involving the control of the tangent plane at the control points is shown. In the bottom, a rendering is shown that is obtained from surface modeling with H-splines. FIG. 7 illustrates how the curvature along a parameter direction can be controlled. The thick black squares are the interpolatory control points, the tangent plane is illustrated by rectangles and through the dashed vertical arrow the curvature with respect to one parameter direction can be controlled. It can be observed that the parameter line to which the dashed vertical arrow is anchored locally changes curvature when changing the magnitude of the arrow, which directly represents the curvature itself. This opens new possibilities in shape modeling. For example, in architecture or mechanics, often walls or elements with a specific type of curvature along one direction must be modeled. H-splines allows for an exact modeling of such shapes. The control of the curvature on profile curves is also widely used in aerospace industry for instance. On profile curves, the curvature corresponds to the second order derivative, which is made directly accessible through H-splines. The access to higher order derivatives allows to easily construct singularities in the shape, such as sharp corners by super-positioning of several control points interpolating derivatives. Furthermore, the support of H-splines is equal to two (2), which is shorter than the support of smooth NURBS and T-splines. Hence, H-splines allow for a more localized control of the surface when displacing a control point.

Because NURBS and T-splines are polynomial, non-polynomial shapes such as conic sections only can be represented with rational expressions, which allow to represent, for instance, an arc of a circle. Then, several arcs are combined to represent a full circle. The generalized H-splines are not restricted to polynomials but can also represent exponential polynomials. This allows to exactly construct trigonometric, hyperbolic, and polynomial shapes or a combination of them. Thereby, no segments have to be patched together and fewer control points are needed than with NURBS or T-splines. Furthermore, transcendental shapes such as helices or spirals, which cannot be represented with NURBS are easily constructed with H-splines. Additionally, the expression of H-splines is non-rational and the H-spline shapes are constructed with only uniform shifts which substantially simplify the overall expressions related to surface construction.

Figure 8:
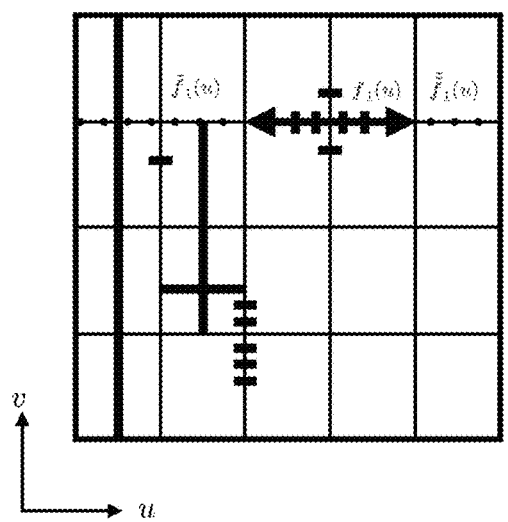
FIG. 8 depicts the control meshes of two surfaces which contain H-junctions in both directions and the segments that need to be watertightly joined are drawn with arrow heads at their endpoints.
Figure 8:
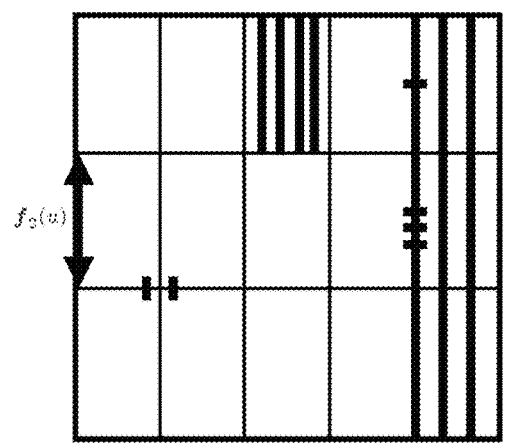

Generally, it is possible to construct watertight junctions with NURBS by the use of T-splines. This implies that the junction between two surface patches consists of two boundaries, each belonging to one surface patch, that geometrically coincide. Hence, they are leak-proof in a physical sense. In the context of CAD this has the advantage that such a watertight junction can be discretized with arbitrary precision for displaying purposes. However, this only allows to connect surface patches through the boundaries of their control meshes. With the features of the method according to one aspect of the present invention, it is possible to connect two or more surface patches of a first and second surface of graphical objects through arbitrarily chosen line segments in the control mesh. FIG. 8 shows control meshes of a first and second surface $\sigma_1$ and $\sigma_2$. Both control meshes have been refined in the u- and v-direction by creating H-junctions which is illustrated by the thick horizontal and vertical line structures. The two surfaces $\sigma_1$ and $\sigma_2$ are to be watertightly connected by matching the horizontal segment $f_1(u)$ indicated with arrow heads on the left to the vertical segment $f_2(v)$ indicated with arrow heads on the right. We see that while $f_2(v)$ corresponds to a part of a boundary of the control mesh of $\sigma_2$, the segment $f_1(u)$ is not a boundary segment of the control mesh of $\sigma_1$. The first and second surfaces $\sigma_1$ and $\sigma_2$ which are described by these two control meshes are shown as two three-dimensional (3D) graphical objects in FIG. 9. The first and second surfaces $\sigma_1$ and $\sigma_2$ can be displayed on a computer display as two-dimensional projections of 3D graphical objects, or can also be displayed on a 3D computer display as a 3D object.

Figure 11:
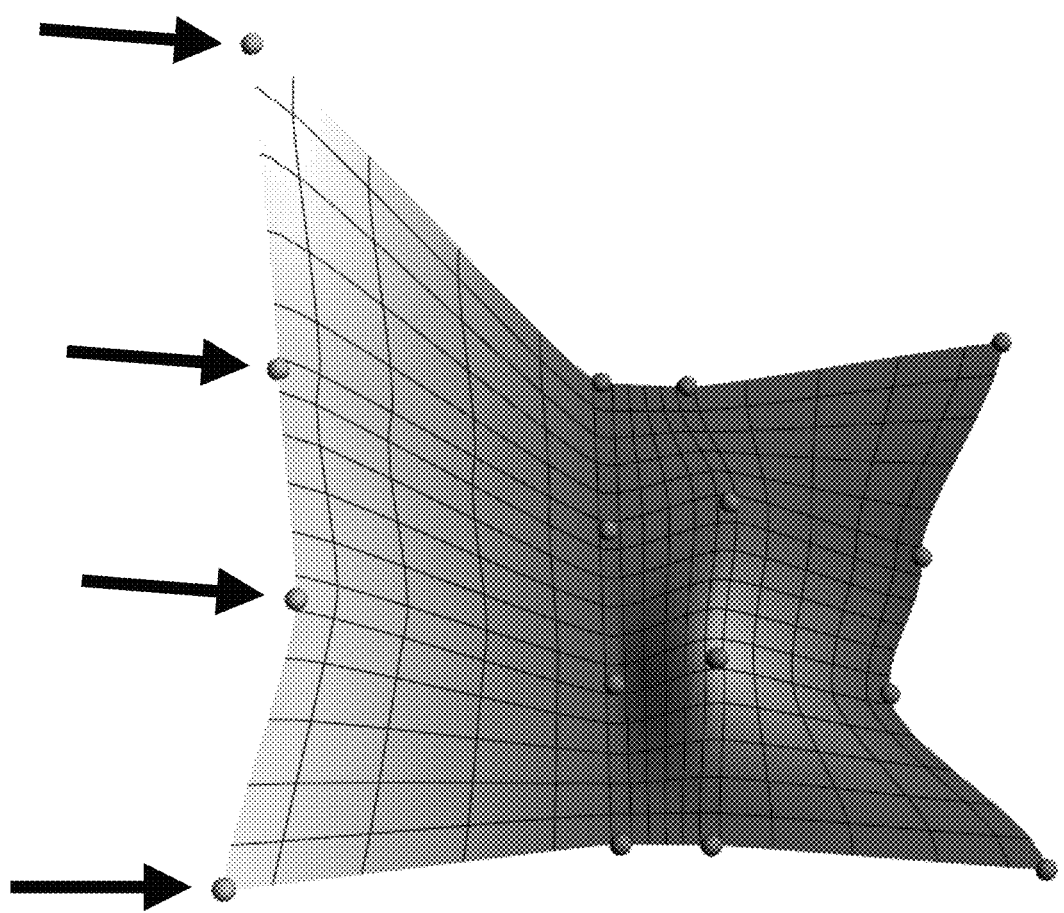
FIG. 11 shows the rectangular surface together with the four control points (indicated by arrows) that represent the boundary that needs to be watertightly joined to the spherical surface shown in FIG. 10.
Figure 12:
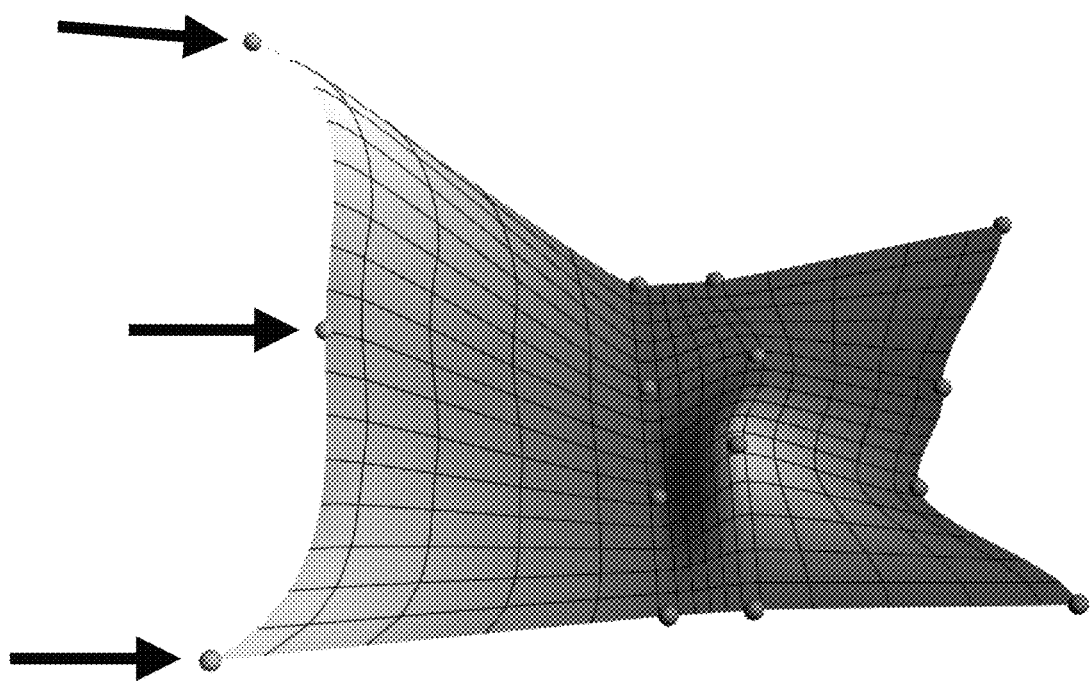
FIG. 12 shows the modified boundary of the rectangle that geometrically exactly coincides with the corresponding boundary of the spherical surface. The arrows indicate the control points which define the modified boundary.
Figure 13:
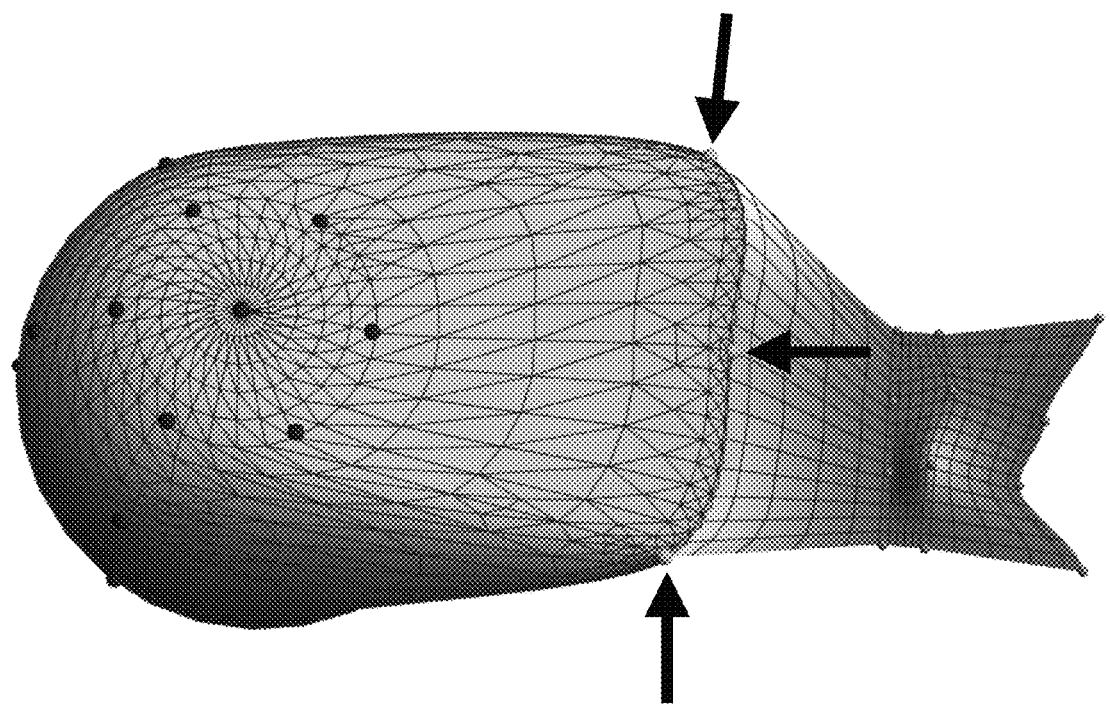
FIG. 13 illustrates the watertight junction between the spherical and the rectangular surface. The arrows indicated the control points which define the watertight junction.
Figure 14:
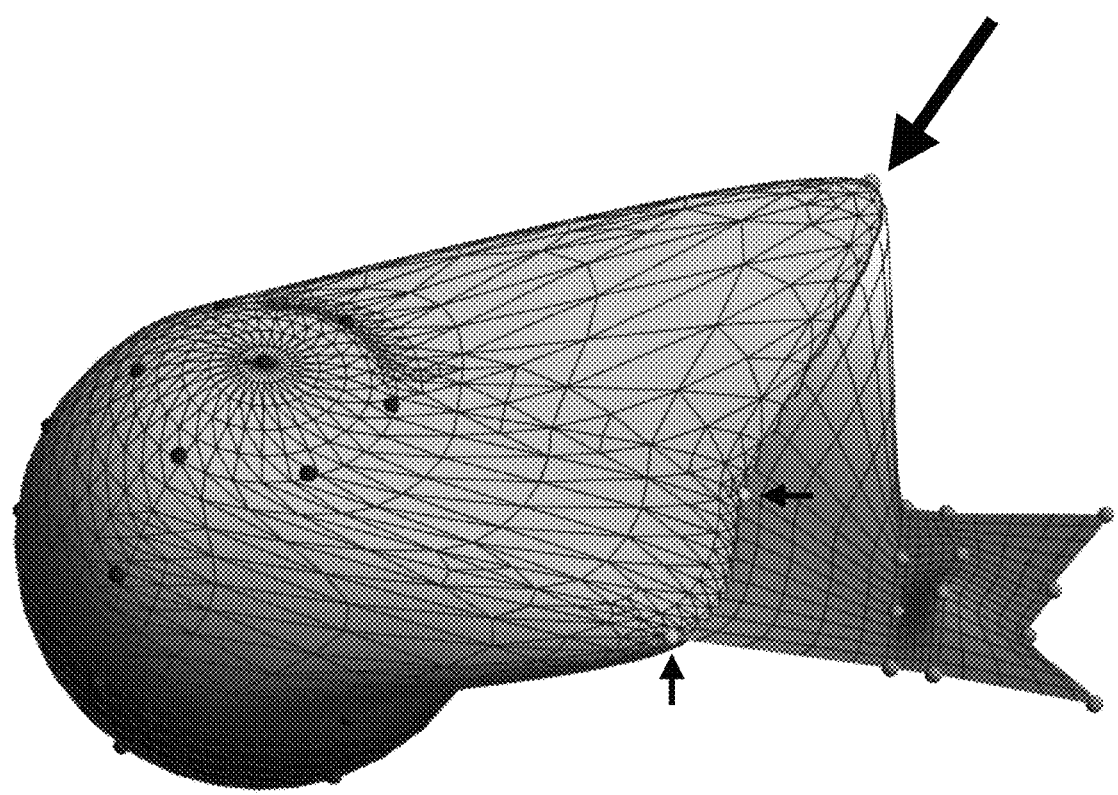
FIG. 14 shows how the combined surface illustrated in FIG. 13 remains watertight by modifying one control point (large arrow) that lies on the constructed watertight boundary. The two small arrows indicate the control points that have not been modified.
Figure 16:
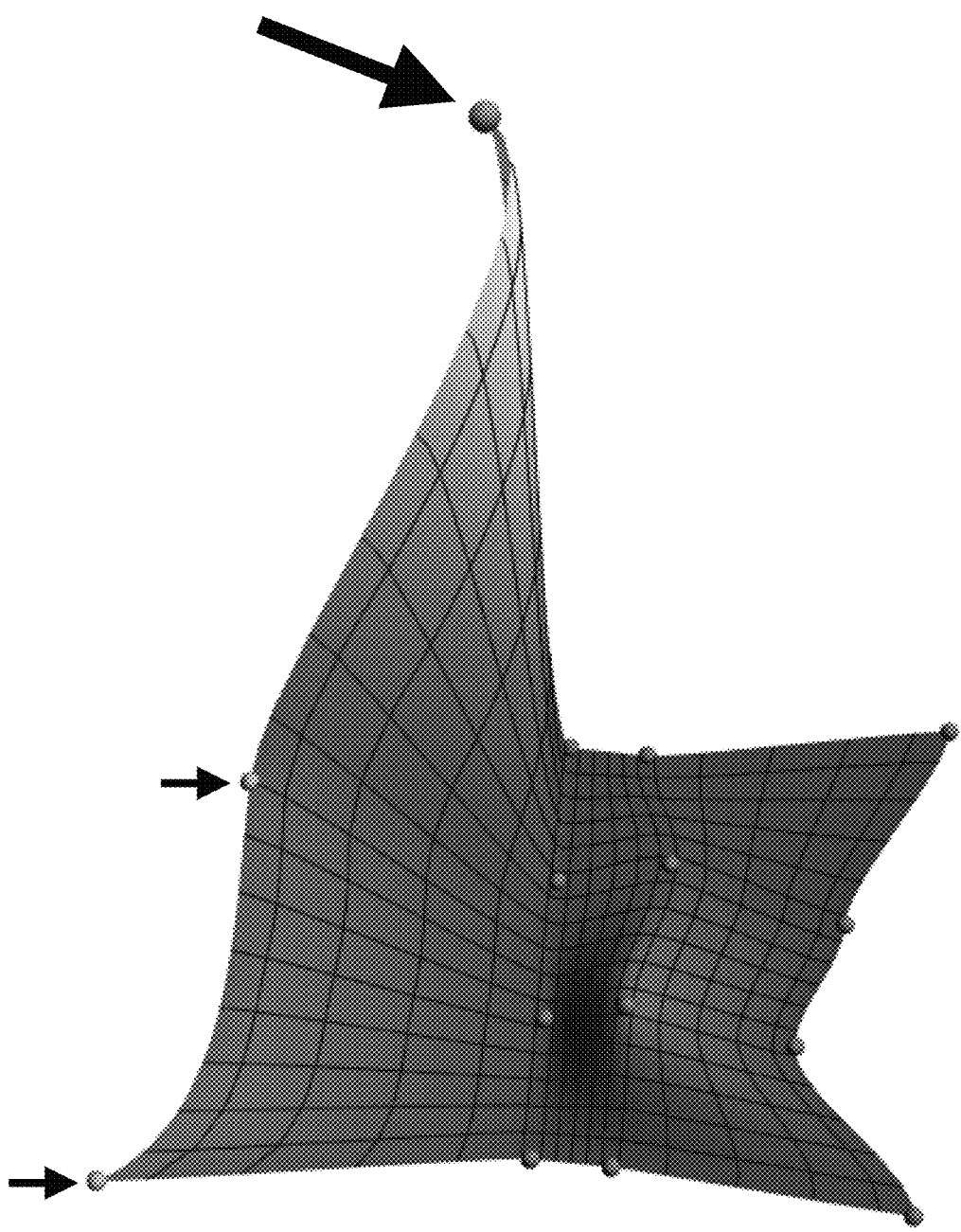
FIG. 16 shows the rectangular patch of the combined surface with modified control point (large arrow). The two small arrows indicate the control points that have not been modified.

It can be seen that the boundary where the first and the second surfaces are supposed to be joined is not watertight. FIG. 10 and FIG. 11 show two surface patches or first and second regions of the first and second surfaces, respectively, where the control points that define the curves $f_1(u)$ and $f_2(v)$ are indicated with arrows. According to one aspect of the present invention, it is possible to modify either of the first or the second region that are represented by two curves $f_1(u)$ or $f_2(v)$ such that they coincide, to modify either the first surface, the second surface, or both, to thereby create a watertight junction between the first and second surfaces. FIG. 12 shows how the corresponding boundary of the second region of second surface $\sigma_2$ has been modified in order to match the first surface $\sigma_1$ at the corresponding location and the resulting watertight junction is shown in FIG. 13, thereby forming a modified second surface at the second region. It is noted that in FIG. 13, the first surface $\sigma_1$ has not been modified, but the second surface second surface $\sigma_2$ has been modified at the second region. However, it is also possible to modify the first surface, or both the first and the second surface, by applying these principles. If now a control point of the joint boundary is modified, the resulting combined surface that is composed of the modified second surface and the first surface is modified as well and the junction still remains watertight. This process is illustrated in FIGS. 14, 15, and FIG. 16 that show the separate surface patches with modified control points.

Figure 17A:
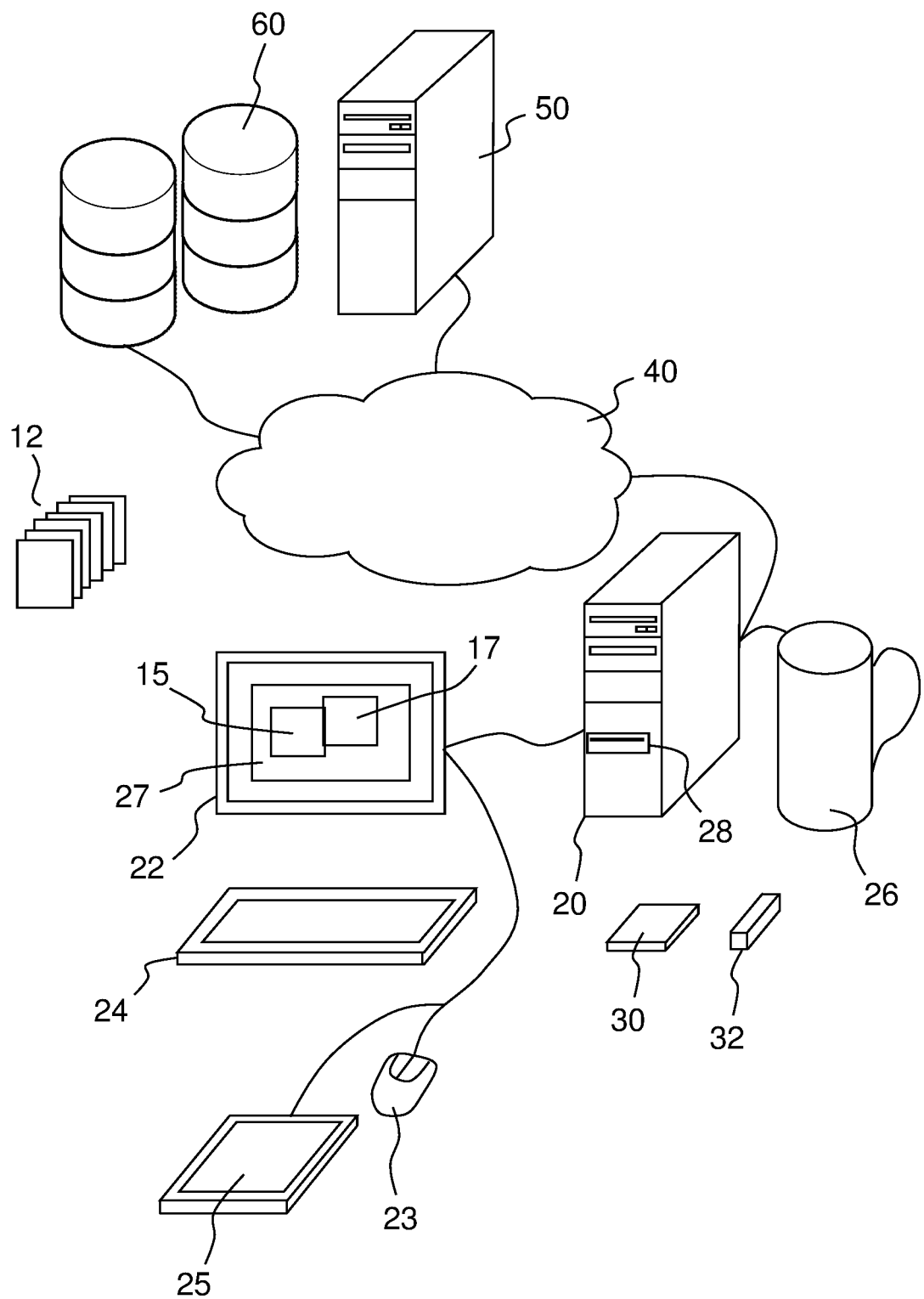
FIG. 17A shows a schematic, perspective view of a computer system that can be used for implementing the method of creating a watertight boundary between two graphical elements.

Therefore, as discussed above, according to some aspects of the present invention, a system and method is provided for creating watertight surfaces with interpolatory control points in a computing environment, and displaying the results for example with a computer system as shown in FIG. 17A, using generalized first and second order Hermite splines. One step of the method can be the defining of a locally refinable mesh in the parameter domain. A further step is the creation of watertight boundaries between two surface patches in the parameter domain, by modifying a first region of the first surface, a second region of the second surface, or both. The surface can be computed based on the basis functions and the control mesh definition in the parameter domain.

Figure 17B:
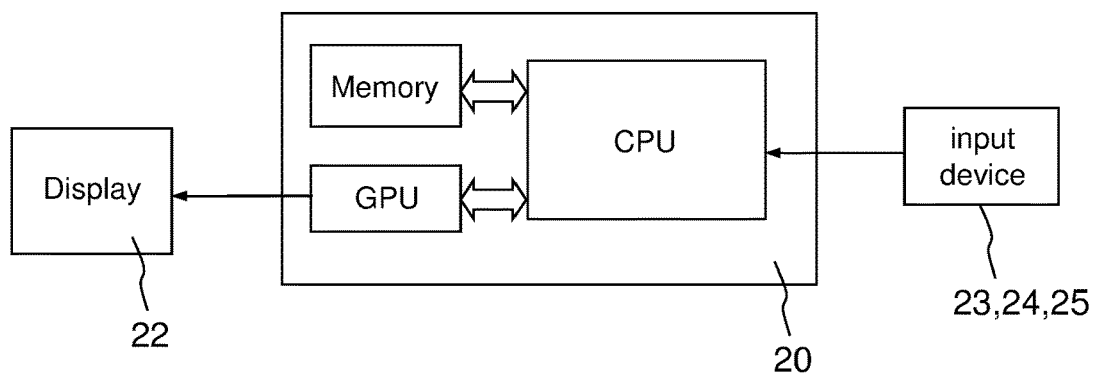
FIG. 17B shows a schematic view of the processing device, according to still another aspect of the present invention.
Figure 18:
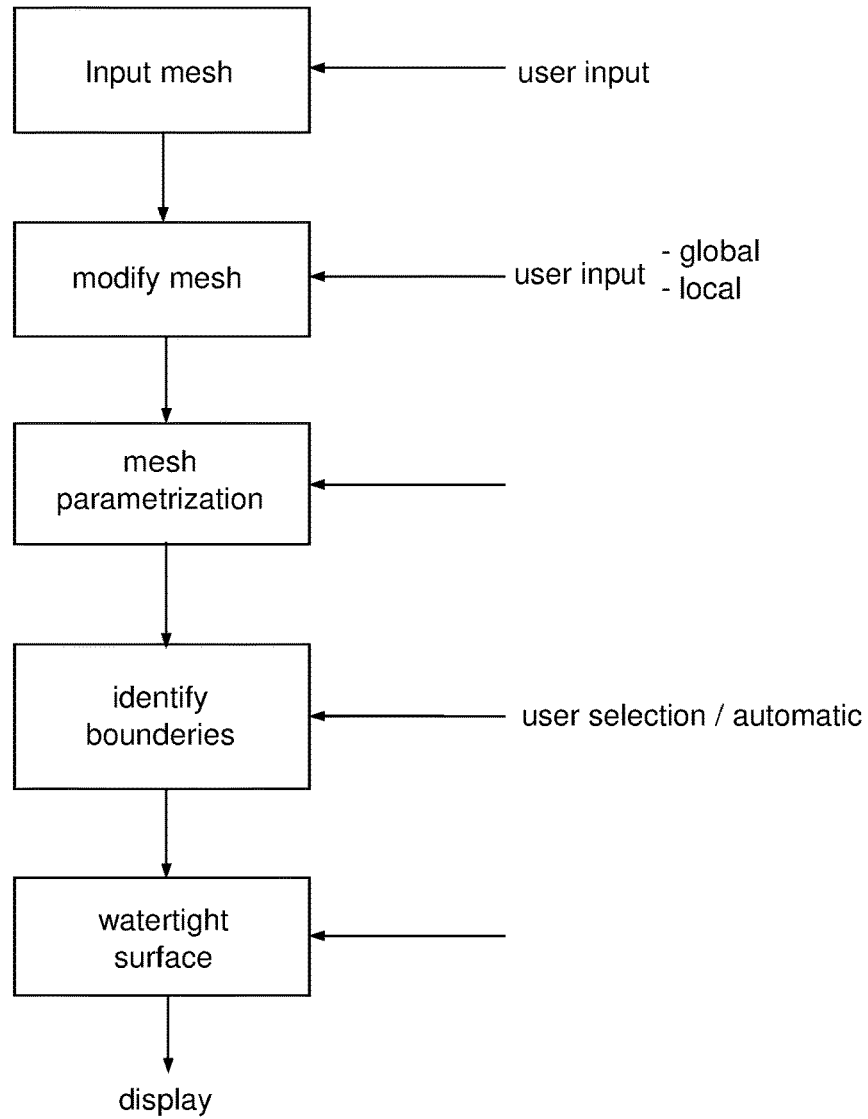
FIG. 18 shows a schematic view of an exemplary method, according to another aspect of the present invention.

As shown in FIG. 18, a simplified flowchart is shown for the method for creating watertight surfaces with interpolatory control points in a computing environment, including input devices 23, 24, 25, computing device 20, and display 22, the computing device including a CPU, a GPU, and memory, as shown in FIGS. 17A-17B. Preferably, in a step S1, three-dimensional input meshes are defined and their corresponding 2D mesh in the parameter domain is computed by 20 using H-splines. The user can specify the 3D meshes with an input device such as 23, 24, 25, for example but not limited to the use of a pre-defined shape library that generate a first surface model and a second surface model on the computer that represents the first surface and second surface, respectively, each surface defining a graphical element computed with 20 and 22. In a step S2, the 3D input meshes are modified through user interaction by 23 or 25. For example, this can be done by dragging and displacing control points with input device 23, 25 and by global or local refinement computed through the processing unit 20, or automatically or user-defined, such as by specifying mesh parameter values with device 24, and then displaying the interactively defined first surface and the second surface on the display while performing interaction with an input device 23, 25.

Next, in step S3, a locally or globally refined 2D mesh parameterization is defined. Based on the geometry of the 3D meshes a computing device 20 computes the corresponding 2D meshes in the parameter domain by establishing a mathematical formulation describing the first surface, and the second surface, to obtain a first parameterization of the surface and a second parameterization of the second surface, before modifying, wherein the first parameterization and the second parameterization are defined by interpolatory control points and control points that interpolate higher order derivatives. Next, in a step S4, boundaries of the first and second surface are identified on the 3D mesh by user input, either interactively through 23 or 25, or in a user defined way through 24, to select a first region and a second region on the first surface and the second surface, respectively. The first region and the second region are boundaries of the first and second surface, respectfully, that are to be matched. This can be done by a manual selection by a user via a graphical user interface directly on the first and second surfaces, or by an algorithm that designates the first and second region, for example after the user has selected the open space between the first and second surface. By using processing device 20, a mathematical formulation is established describing the first region of the first surface, and the second region of the second surface, to obtain a first parameterization of the first region and a second parameterization of the second region, before the step of modifying, wherein the first parameterization and the second parameterization are defined by interpolatory control points and control points that interpolate higher order derivatives. Next, in a step S5, a watertight surface is computed in the 2D parameter domain by a computing device 20. This can be done by either modifying the first surface at the first region, the second surface at the second region, or by modifying both first and second surfaces at both the first and second region. The modified surface is modified to geometrically match either the first or the second surface at the first or the second region, respectively, is computed in the parameter domain by a device 20, and can be displayed in 3D by a display device 22. The computation by device 20 consists in modifying the first surface to a modified first region and the second region, by geometrically matching the first region of the first surface with the second region of the second surface to establish the modified first region. Device 20 executes this task by replacing the first parameterization describing the first region with a new parameterization describing the modified first region such that the first region matches with the second region and the modified first surface and the second surface form a watertight connection at a modified first region and the second region.

With respect to the H-spline, the generalized first order H-spline can be defined by the vector $$\alpha=(\alpha_1,\alpha_2,\alpha_3,\alpha_4) \qquad \text{Eq. (1)}$$

which defines whether the spline basis function is polynomial, exponential or both of them as can be seen in Equation (7) below. The elements of a are real or complex valued parameters. The generator, i.e. the H-spline function which depends on a is defined as $$\phi^\alpha=(\phi_1^\alpha,\phi_2^\alpha) \qquad \text{Eq. (2)}$$

such that $$\phi_1^\alpha(k)=(\phi_2^\alpha)'(k)=\delta_k, \text{ and} \qquad \text{Eq. (3)}$$

$$(\phi_1^\alpha)'(k)=\phi_2^\alpha(k)=0, \qquad \text{Eq. (4)}$$

where k is an integer and $\delta_k$ is the Kronecker-delta.

For $t\in\mathbb{R}$ $$\phi_1^\alpha = \begin{cases} \varphi_1^\alpha(t) & t \geq 0 \\ \varphi_1^\alpha(-t) & t < 0 \end{cases} \qquad \text{Eq. (5)}$$

$$\phi_2^\alpha = \begin{cases} \varphi_2^\alpha(t) & t \geq 0 \\ -\varphi_2^\alpha(-t) & t < 0 \end{cases} \text{ and} \qquad \text{Eq. (6)}$$

$$\varphi_i^\alpha(t) = \sum_{m=1}^{N_d} e^{\alpha_{(m)}} \sum_{n=1}^{n_{(m)}} c_n^m t^{n-1} \chi_{[0,1]}(t) \text{ for } i=1,2, \qquad \text{Eq. (7)}$$

where $\chi$ is the characteristic function, the $c_n^m$ are constants such that the above equations are satisfied, $\alpha_{(m)}$ are the $N_d$ distinct elements of $\alpha$ and $n_{(m)}$ is the multiplicity of $\alpha_{(m)}$. For $\alpha=(0,0,0,0)$ the classic cubic Hermite splines are obtained. Equations (1)-(7) altogether define the construction of the generalized first order H-spline. This spline can then further be used to construct H-spline surfaces as defined below in Equation (18). The construction of generalized H-splines can be extended to higher orders.

The generalized second order H-spline is constructed in a similar way with the vector $$\alpha=(\alpha_1,\alpha_2,\alpha_3,\alpha_4,\alpha_5,\alpha_6), \text{ and} \qquad \text{Eq. (8)}$$

$$\phi^\alpha=\phi_1^\alpha,\phi_2^\alpha,\phi_3^\alpha), \qquad \text{Eq. (9)}$$

where additionally the equations $$(\phi_1^\alpha)''(k)=(\phi_2^\alpha)''(k)=(\phi_3^\alpha)'(k)=\phi_3^\alpha(k)=0, \text{ and Eq.} \qquad \text{(10)}$$

$$(\phi_3^\alpha)''(k)=\delta_k \qquad \text{Eq. (11)}$$

are satisfied and $$\phi_3^\alpha = \begin{cases} \varphi_3^\alpha(t) & t \geq 0 \\ \varphi_3^\alpha(-t) & t < 0 \end{cases} \qquad \text{Eq. (12)}$$

For the vector $\alpha=(0,0,0,0,0,0)$, the classic quintic Hermite splines are obtained. With a similar strategy generalized H-splines of any order are constructed.

Next, the H-spline refinement is explained. With this processing step, we generate more control points on a surface without changing the geometry of the shape as shown in FIG. 4 and FIG. 5. This allows us to perform local and global surface refinements. The property that enables this processing step originates from the refinability property of the H-splines. For a positive integer m the H-spline is defined as $$\phi^{\frac{\alpha}{m}}(t) = \left(\phi_1^{\frac{\alpha}{m}}(mt), \frac{1}{m}\phi_2^{\frac{\alpha}{m}}(mt)\right) \qquad \text{Eq. (13)}$$

for the first order case and $$\phi^{\frac{\alpha}{m}}(t) = \left(\phi_1^{\frac{\alpha}{m}}(mt), \frac{1}{m}\phi_2^{\frac{\alpha}{m}}(mt), \frac{1}{m^2}\phi_3^{\frac{\alpha}{m}}(mt)\right) \qquad \text{Eq. (14)}$$

for the second order case. The refinement relation is specified by $$\phi^{\frac{\alpha}{m^{i-1}}}(t) = \sum_{k\in\mathbb{Z}} H_i[k]\phi^{\frac{\alpha}{m^i}}\left(t - \frac{k}{m^i}\right) \qquad \text{Eq. (15)}$$

for positive integers i, where the refinement matrix is defined as $$H_i[n] = \left(\phi^{\frac{\alpha}{m^{i-1}}}\left(\frac{n}{m^i}\right) \left(\phi^{\frac{\alpha}{m^{i-1}}}\right)'\left(\frac{n}{m^i}\right)\right) \qquad \text{Eq. (16)}$$

for the first order H-spline and as $$H_i[n] = \left(\phi^{\frac{\alpha}{m^{i-1}}}\left(\frac{n}{m^i}\right) \left(\phi^{\frac{\alpha}{m^{i-1}}}\right)'\left(\frac{n}{m^i}\right) \left(\phi^{\frac{\alpha}{m^{i-1}}}\right)''\left(\frac{n}{m^i}\right)\right) \qquad \text{Eq. (17)}$$

for the second order H-spline. An important step is described by Equation (15), which describes how one H-spline can be described as a sum of several refined H-splines. This step allows to replace one control point by several new control points without changing the surface geometry in a shape modeling setting.

With respect to the H-spline surfaces, a parametric surface $\sigma=(x,y,z)$ using H-splines is given by:

$$\sigma=(u,v)=(x(u,v),y(u,v),z(u,v))=\Sigma_{i=0}{}^I\Sigma_{j=0}{}^J\Sigma k\in\mathbb{Z}\ \Sigma l\in$$
$$\mathbb{Z}\ \sigma^{(i,j)}(k,l)\phi_{i+1}^\alpha(u-k)\phi_{j+1}^\alpha(v-l) \text{ with } I,J\in\{0,1\} \qquad \text{Eq. (18)}$$

for the first order case and I, J$\in\{0,1,2\}$ for the second order case with $$\sigma^{(i,j)}(k,l) = \sigma^{(i,j)}(u,v)|_{u=k,v=l} = \frac{\partial^{i+j}\sigma(u,v)}{\partial^i u \partial^j v}\Big|_{u=k,v=l} \qquad \text{Eq. (19)}$$

Figure 3:
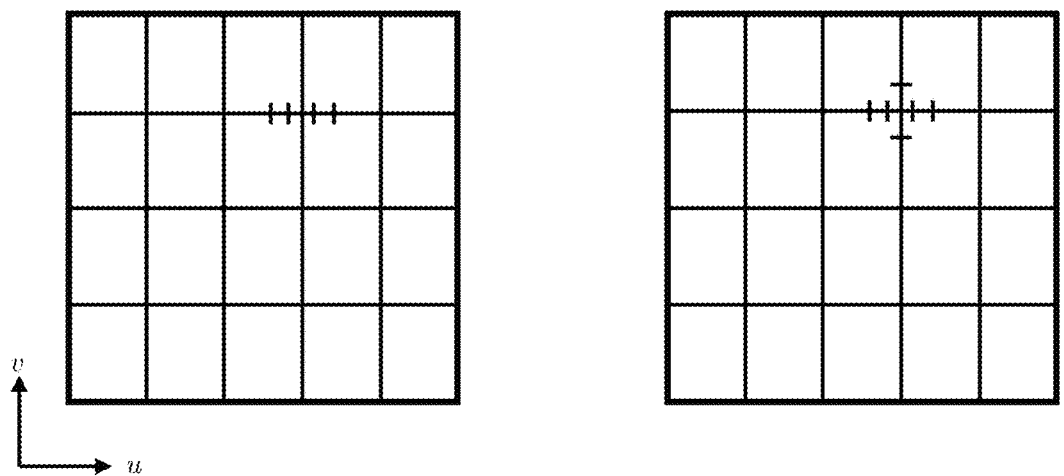
FIG. 3 is a schematic representation showing the creation of H-junctions through local refinement in one direction on the left and in both directions of the parameter domain on the right.

Next, the processing step of creating H-junctions through local surface refinements is explained. An elementary local refinement operation is achieved by refining one control point of $\sigma$ with the coordinates (p,q) for p, q $\in\ \mathbb{Z}$ with respect to one direction of the parameter domain, for example but not limited to the v-direction, and a refinement factor m as shown in FIG. 3. FIG. 3 shows the initial regular lattice in the parameter domain, where the vertices correspond to the locations of the control points. By performing a refinement operation on one control point, in the parameter domain the corresponding vertex is replace by several new H-junctions indicated by the four small dashes on the left side of FIG. 3. On the right side, a refinement in both parameter directions has been performed, which his indicated by the additional two dashes in the v-direction. This operation does not change the geometry of the surface. It is expressed as $$\sum_k \sum_l \sigma^{(i,j)}(k,l)\phi_{i+1}^\alpha(u-k)\phi_{j+1}^\alpha(v-1) = \quad \text{Eq. (20)}$$

$$\sum_{\substack{k \in \mathbb{Z} \\ k \neq p}} \sum_{l \in \mathbb{Z}} \sigma^{(i,j)}(k,l)\phi_{i+1}^\alpha(u-k)\phi_{j+1}^\alpha(v-l) +$$

$$\sum_{\substack{l \in \mathbb{Z} \\ l \neq q}} \sigma^{(i,j)}(p,l)\phi_{i+1}^\alpha(u-p)\phi_{j+1}^\alpha(v-l) +$$

$$\phi_{i+1}^\alpha(u-p)\sigma^{(i,j)}(p,q) \sum_{s=-1}^{1} [H_1[s]]_{j+1}\phi^{\frac{\alpha}{m}}\left(t-\frac{s}{m}\right)$$

where $[H_1[s]]_{j+1}$ is the (j+1)th line of the matrix $H_1$.

In practice, typically, if the control point $\sigma(p,q)$ is chosen to be refined, the above refinement operation will be applied to $\sigma^{(i,j)}(p,q)$ for all i, j. That way, the refinement of the surface point will lead to new interpolating surface points as well as to points that interpolate their corresponding higher-order derivatives. A local refinement operation can also be applied to several neighboring control points or even an entire row or column in the parameter domain. This implies standard upsampling of the control points by the refinement factor m followed by discrete filtering with the filters given by the matrix H. In this case the curve segment of the surface that needs to be refined is described by the control points f[n]=(f[n], f'[n]) for the first order H-spline and by f[n]=(f[n], f'[n], f''[n]) for the second order case. The refinement through upsampling and filtering is defined as $$f(t) = \sum_{n \in \mathbb{Z}} f^T[n]\phi^\alpha(t-n) = \quad \text{Eq. (21)}$$

$$\sum_{p \in \mathbb{Z}} \sum_{n \in \mathbb{Z}} \frac{f_{\uparrow m}^T[n]H_1[p-mn]\phi^{\frac{\alpha}{m}}\left(t-\frac{p}{m}\right)}{f_1^T[p]} = \sum_{p \in \mathbb{Z}} f_1^T[p]\phi^{\frac{\alpha}{m}}\left(t-\frac{p}{m}\right)$$

where ↑ m denotes upsampling by a factor of m.

It is assumed that the insertion of a new control point through a local refinement creates an H-junction in the parameter domain. If a one-directional, local or global, refinement is performed in both parameter-domains, then not only a curve segment of the surface is refined but an entire surface patch. If an entire row or column of the control mesh has been refined, then the refinement is global in the sense of a NURBS control point refinement.

Moreover, according to another aspect of the present invention, the system and method allows to perform a direct surface control of the displayed graphical elements. The surface formulation using H-splines implies that if the control points $\sigma_{(0,0)}(k,l)$, which interpolate the surface are displaced, the surface immediately changes. Similarly, the control of higher order quantities that are related to the surface can directly be controlled. For example modification of the points $\sigma^{(1,0)}(k,l)$ and $\sigma^{(0,1)}(k,l)$ allow to control the tangents along the u- and v-direction at the surface point $\sigma(k,l)$, whereas $\sigma^{(1,1)}(k,l)$ allows to directly modify the tangent plane as illustrated in FIG. 6. The modification of $\sigma^{(2,0)}(k,l)$ and $\sigma^{(0,2)}(k,l)$ allow to control the curvature of the curves along the u- and v-direction of the surface as shown in FIG. 7. Higher order cross-derivatives are modified by changing the locations of $\sigma^{(2,1)}(k,l)$, $\sigma^{(1,2)}(k,l)$, and $\sigma^{(2,2)}(k,l)$ for instance.

As discussed above, according to one aspect of the present method and system, it is possible to create watertight junctions between surfaces of graphical objects. With the use of H-splines it is possible to exactly represent any curve segment on a surface corresponding to a straight line segment in the parameter domain between any two given control points (which lie on a parameter line) as a possibly refined H-spline curve $f(t)=(f_x(t), f_y(t), f_z(t))$. Thereby, no additional control point is used to construct f than the ones that lie in between the given control points. This allows one to exactly match the first and second region, for example two curves $f_1$ and $f_2$ that correspond to two subsegments of parameter lines of the first and second surfaces $\sigma_1$ and $\sigma_2$ by replacing one curve by the other in the global surface expression. The concept is illustrated in FIG. 8 where the two horizontal (left) and vertical (right) line segments indicated with arrow-heads are to be joined in a watertight manner.

Without loss of generality we consider surfaces $\sigma(u,v)$ with normalized parameter domain, i.e., u, v∈[0,1]. Because the support of the H-spline is [−1,1] every subdomain $\sigma^{(i,j)}$ is described as $$\Sigma_k \Sigma_l \sigma^{(i,j)}(k,l)\phi_{i+1}^\alpha(Mu-k)\phi_{j+1}^\alpha(Nv-1) \quad \text{Eq. (22)}$$

where M and N correspond to the unrefined number of control points minus one in the u and v direction, respectively, of $\sigma^{(i,j)}$.

In the most general case the curve segment $f_1$ of a surface $\sigma_1$ is to be replaced by $f_2$ of a surface $\sigma_2$ as shown in FIG. 8. The curve segment $f_2$ needs to be expressed with only the (possibly) refined control points that describe this curve itself such that t∈[0,1]. Due to boundary conditions also the neighboring curve segments of $f_1$, i.e., $\widetilde{f_1}$ and $\widetilde{\widetilde{f_1}}$ have to be reparameterized to have t∈[0,1]. We have $$\sigma_1(u,v) = \widetilde{\sigma_1}(u,v) + f_1(u) + \widetilde{f_1}(u) + \widetilde{\widetilde{f_1}}(u) \quad \text{Eq. (23)}$$

as shown in FIG. 8, where $\widetilde{\sigma_1}$ is the original surface $\sigma_1$ without the parts that are to be replaced or reparameterized.

We describe the operation for a non-refined segment $f_2$ that replaces $f_1$ however, it is assumed that $f_2$ is possibly locally or (partially) globally refined by the operations described above. If $f_2$ is described by $P_2+1$ non-refined control points and 0≤ll≤NN≤N such that $$f_2(v) = \sum_{l=ll}^{NN} F_2^T[l]\phi^\alpha(Nv-l), \text{ and} \quad \text{Eq. (24)}$$

$$v \in \left[\frac{ll}{N}, \frac{NN}{N}\right] \quad \text{Eq. (25)}$$

then we construct the reparameterized curve $F_2(s)$ as $$F_2(s) = f_2\left(s = \frac{P_2 v + ll}{N}\right) \qquad \text{Eq. (26)}$$

such that $s \in [0,1]$. Here $F_2 = (f_x, f_y, f_z)$ is the matrix containing the samples of the $f_2$ and its (higher order) derivatives. The curve $F_2$ with $s \in [0,1]$ is geometrically equivalent to $f_2(v)$. In a similar way the curves $\tilde{f}_1$ and $\tilde{\tilde{f}}_1$ are to be reparameterized to construct the curves $\tilde{f}_1$ and $\tilde{\tilde{f}}_1$. Now the modified surface $$\Sigma_1(u,v) = \widetilde{\sigma_1}(u,v) + F_2(u) + \tilde{f}_1(u) + \widetilde{\tilde{f}}_1(u) \qquad \text{Eq. (27)}$$

shares a watertight boundary with $\sigma_2$. The composite watertight surface consisting of the two patches $\Sigma_1$ and $\sigma_2$ (i.e., $\Sigma_1 + \sigma_2$) with u, v∈[0,1] is shown in FIG. 13.

Figure 9:
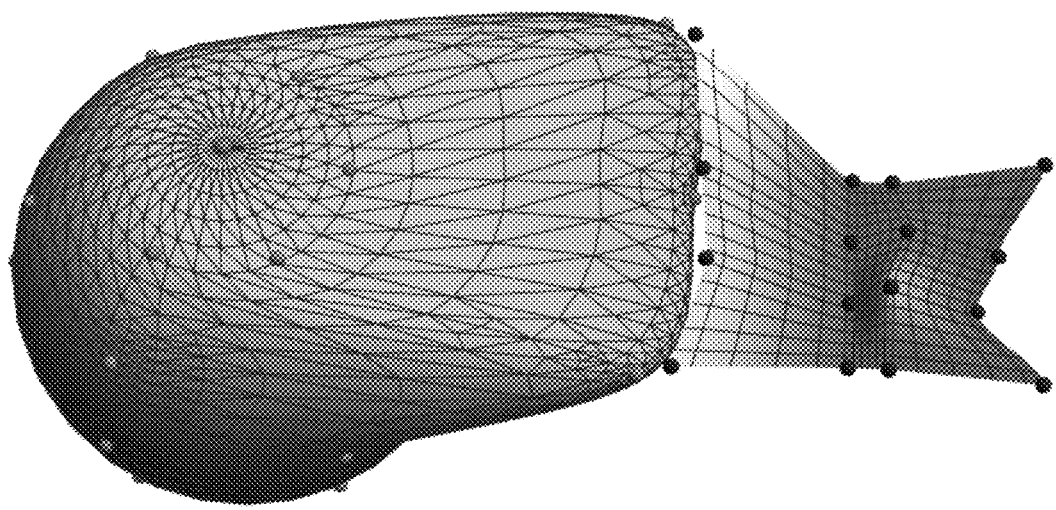
FIG. 9 depicts the two surfaces and shows the mismatch, for example an open space, between the boundaries that are to be joined.

FIG. 17A shows a perspective view of an exemplary device and system for implementing the method described above. The system includes a data processing device 20, for example but not limited to a personal computer (PC), Macintosh™ computer, laptop, notebook, netbook, data processing workstation, smartphone, or a tablet. A dataset 12 is schematically shown, that can be located locally in a storage 26 associated with processing device 20, or can be accessed via the network 40, for example the Internet, from various remotely located devices, for example servers 50 and storage 60. Processing device 20 can be equipped with one or several hardware microprocessors, dedicated graphics processors such as but not limited to graphical processing units (GPU), central processing unit (CPU) and with internal memory. Also, processing device 20 is connected to a data input device, for example a keyboard 24 to provide for user instructions for the method, computer mouse 23, or trackpad 25, and a data display device 22, for example a computer screen, to display different stages and final results of the data processing steps of the method. An exemplary processing device 20 with display device 22 and data input devices 23, 24, 25 is shown in FIG. 18A. The display device 22 is capable of displaying 2D or 3D images to represent results and processing steps of the method. For example, the graphical user interface 27 can be shown, as schematically shown in FIGS. 9 and 13, that is displaying the first surface 15 and the second surface 17, and the shapes and appearance of the first and second surface 15, 17 can be changed directly and in real-time via the data input devices 23, 24, 25. This allows to perform the direct surface control described above.

The data input devices 23-25 can also be used directly control the control points of the surfaces 15 and 17 and its higher order derivatives via CPU. The modified surfaces are computed in terms of rendering primitives which are processed in real time by a GPU to construct the graphics object and displayed by a display device 22. External memory, main memory (RAM) and graphics memory (VRAM) allow one for real time shape interaction through a display refresh rate of typically 60 Hz for modern computer screens 22, such as but not limited to liquid crystal device (LCD) monitors, based on frame buffer updates of the graphics objects that describe the surfaces 15 and 17.

Also, the interpolatory control points and control points that interpolate higher order derivatives that are associated with the parameterization of the first and second surface 15, 17 etc. can also be represented on computer screen 22. Processing device 20 is also connected to a network 40, for example the internet, to access various cloud-based and network-based services, for example but not limited to cloud or network servers 50, cloud or network data storage devices 60, specific web servers providing databases of graphics data.

The method described above can also be performed on hardware processors of one or more servers 50, and the results sent over the network 40 for rendering and display on computer screen 22 via processing device 20. Processing device 20 can be equipped with a data input/output port, for example a CDROM drive, Universal Serial Bus (USB), card readers, storage device readers, to read data, for example computer readable and executable instructions, from non-transitory computer-readable media 30, 32. Non-transitory computer-readable media 30, 32 are storage devices, for example but not limited to external hard drives, flash drives, memory cards, USB memory sticks, CDROM, Blu-Ray™ disks, optical storage devices and other types of portable memory devices that are capable of temporarily or permanently storing computer-readable instructions thereon. The computer-readable instructions can be configured to perform the method, as described above, when loaded to processing device 20 and executed on a processing device 20 or a cloud or other type of network server 50, for example the one shown in FIG. 17A.

According to some aspects of the invention, the system and method can substantially facilitates the modeling process in CAD, computer-aided engineering (CAE), and computer-aided manufacturing (CAM) in the fields of mechanical modeling, industrial design, digital fabrication and manufacturing, as well as computational fluid dynamics and related fields and also animation and character design. Examples of areas of application can also be found in the automotive and aerospace industry, product design, architectural modeling as well as the design of games and animated movies. According to aspects of the invention, substantial advantages are provided by the more efficient description of shapes through H-splines, enabling faster and simpler design of possibly complex watertight surfaces which can also be exploited for rapid execution of computational optimization schemes such as in any kind of mechanical modeling processes, aero- and aquadynamics, fast surface deformation processes as used in simulation and animation or the exchange and communication of protocols describing high quality surfaces with 3D printing devices, CNC machines or industrial robots. Furthermore, according to some aspects of the present invention, the system and method allows to design surfaces that can adopt shapes that are beyond the possibilities of what existing technology can offer.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A method for creating a watertight boundary between a first H-spline surface and a second H-spline surface, the method being performed on a computer device having a display and memory, the method comprising the steps of:
   providing a computer aided design environment that creates a modelled product design including the first H-spline surface and the second H-spline surface;
   displaying the first H-spline surface having a first shape and the second H-spline surface having a second shape on the display, an open space existing between the first H-spline surface and the second H-spline surface;

defining a first region of the first H-spline surface, and defining a second region of the second H-spline surface; and modifying the first H-spline surface to a modified first H-spline surface such that the first region matches with the second region and the modified first H-spline surface and the second H-spline surface form a watertight connection at a modified first region and the second region, the step of modifying including, geometrically matching the first region of the first H-spline surface with the second region of the second H-spline surface by matching interpolatory control points and control points that interpolate higher order derivatives of the first region of the first H-spline surface with interpolatory control points and control points that interpolate higher order derivatives of the second region of the second H-spline surface to establish the modified first region thereby modifying a tangent plane or a curvature of the first region to create the modified first region.

2. The method of claim 1, further comprising the step of: displaying the modified first H-spline surface and the second H-spline surface on the display.

3. The method of claim 1, further comprising the step of: generating a first surface model and a second surface model on the computer that represents the first H-spline surface and the second H-spline surface, respectively, before the step of modifying.

4. The method of claim 1, further comprising the step of: establishing a mathematical formulation using H-splines describing the first region of the first H-spline surface, and the second region of the second H-spline surface, to obtain a first parameterization of the first region and a second parameterization of the second region, before the step of modifying, wherein the first parameterization and the second parameterization are defined by the interpolatory control points and the control points that interpolate higher order derivatives.

5. The method of claim 4, wherein the step of establishing the mathematical formulation using H-splines further comprises:

replacing the first parameterization describing the first region with a new parameterization describing the modified first region.

6. The method of claim 5, wherein the new parameterization defines the modified first region such that coordinates of the interpolatory control points and the control points that interpolate the higher order derivatives of the second region coincide with the interpolatory control points and the control points that interpolate the higher order derivatives of the modified first region, such that the modified first region is geometrically equivalent with the second region.

7. The method of claim 5, wherein the new parameterization and the second parameterization are different while the modified first region is geometrically equivalent with the second region.

8. The method of claim 1, wherein the first H-spline surface and the second H-spline surface are locally refinable.

9. The method of claim 1, further comprising the step of: displaying the modified first H-spline surface and the second H-spline surface interactively on the display while performing the step of modifying with an input device.

10. The method of claim 1, further comprising the step of: modifying coordinates of control points that interpolate higher order derivatives of the first H-spline surface and of the second H-spline surface with an input device, and interactively displaying the first H-spline surface and the second H-spline surface with modified control points on the display.

11. A computer system having a hardware processor, a display, and memory, the hardware processor configured to perform an image processing method for creating a watertight boundary between a first H-spline surface and a second H-spline surface, the hardware processor configured to:

provide a computer aided design environment that creates a modelled product design including the first H-spline surface and the second H-spline surface;

instruct to display the first H-spline surface having a first shape and the second H-spline surface having a second shape on the display, an open space existing between the first H-spline surface and the second H-spline surface;

receive instructions to define a first region of the first H-spline surface, and to define a second region of the second H-spline surface; and modify the first H-spline surface to a modified first H-spline surface such that the first region matches with the second region and the modified first H-spline surface and the second H-spline surface form a watertight connection at a modified first region and the second region, the modifying including, geometrically matching the first region of the first H-spline surface with the second region of the second H-spline surface by matching interpolatory control points and control points that interpolate higher order derivatives of the first region of the first H-spline surface with interpolatory control points and control points that interpolate higher order derivatives of the second region of the second H-spline surface to establish the modified first region thereby modifying a tangent plane or a curvature of the first region to create the modified first region.

12. The computer system of claim 11, the hardware processor further configured to:

instruct to display the modified first H-spline surface and the second H-spline surface on the display.

13. The computer system of claim 11, the hardware processor further configured to:

generate a first surface model and a second surface model that represents the first H-spline surface and the second H-spline surface, respectively, before the modifying.

14. The computer system of claim 11, the hardware processor further configured to:

establish a mathematical formulation using H-splines describing the first region of the first H-spline surface, and the second region of the second H-spline surface, to obtain a first parameterization of the first region and a second parameterization of the second region, before the modifying, wherein the first parameterization and the second parameterization are defined by the interpolatory control points and the control points that interpolate higher order derivatives.

15. The computer system of claim 14, wherein for the establishing of the mathematical formulation using H-splines, the hardware processor is further configured to replace the first parameterization describing the first region with a new parameterization describing the modified first region.

16. A non-transitory computer readable medium having computer instructions recorded thereon, the computer instructions configured to perform a method for creating a watertight boundary between a first H-spline surface and a second H-spline surface when executed on a hardware processor of a computer having memory and a display, the method comprising the steps of:
- providing a computer aided design environment that creates a modelled product design including the first H-spline surface and the second H-spline surface;
- displaying the first H-spline surface having a first shape and the second H-spline surface having a second shape on the display, an open space existing between the first H-spline surface and the second H-spline surface;
- defining a first region of the first H-spline surface, and defining a second region of the second H-spline surface; and
- modifying the first H-spline surface to a modified first H-spline surface such that the first region matches with the second region and the modified first H-spline surface and the second H-spline surface form a watertight connection at a modified first region and the second region, the step of modifying including,
  - geometrically matching the first region of the first H-spline surface with the second region of the second H-spline surface by matching interpolatory control points and control points that interpolate higher order derivatives of the first region of the first H-spline surface with interpolatory control points and control points that interpolate higher order derivatives of the second region of the second H-spline surface to establish the modified first region thereby modifying a tangent plane or a curvature of the first region to create the modified first region.

17. The non-transitory computer readable medium of claim 16, further comprising the step of:
- displaying the modified first H-spline surface and the second H-spline surface on the display.

18. The non-transitory computer readable medium of claim 16, further comprising the step of:
- generating a first surface model and a second surface model on the computer that represents the first H-spline surface and the second H-spline surface, respectively, before the step of modifying.

19. The non-transitory computer readable medium of claim 16, further comprising the step of:
- establishing a mathematical formulation using H-splines describing the first region of the first H-spline surface, and the second region of the second H-spline surface, to obtain a first parameterization of the first region and a second parameterization of the second region, before the step of modifying,
- wherein the first parameterization and the second parameterization are defined by the interpolatory control points and the control points that interpolate higher order derivatives.

20. The non-transitory computer readable medium of claim 19, wherein the step of establishing the mathematical formulation using H-splines further comprises:
- replacing the first parameterization describing the first region with a new parameterization describing the modified first region.

\* \* \* \* \*